(12) United States Patent
Sasaki

(10) Patent No.: US 6,717,753 B2
(45) Date of Patent: Apr. 6, 2004

(54) OPTICAL ELEMENT AND METHOD FOR MANUFACTURING SAME

(75) Inventor: Hironori Sasaki, Yamanashi (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/331,606

(22) Filed: Dec. 31, 2002

(65) Prior Publication Data

US 2003/0146187 A1 Aug. 7, 2003

(30) Foreign Application Priority Data

Feb. 6, 2002 (JP) ........................ 2002-029319

(51) Int. Cl.[7] ................ G02B 7/02; G03B 17/26; G03B 21/14; F21V 17/00
(52) U.S. Cl. .............. 359/819; 359/811; 396/526; 362/455; 353/100
(58) Field of Search ................ 359/819, 811, 359/809; 396/526; 362/455; 353/100

(56) References Cited

U.S. PATENT DOCUMENTS 5,420,953 A * 5/1995 Boudreau et al. ............. 385/88
5,909,523 A * 6/1999 Sakaino et al. ............... 385/49

OTHER PUBLICATIONS

Masahiro Uekawa et al., "Silicon Microlens Surface Mounted on V–groove for Low–cost", pp. 163–170, Proceedings of SPIE Reprint, vol. 4652.

* cited by examiner

Primary Examiner—Hung Dang
Assistant Examiner—Joseph Martinez
(74) Attorney, Agent, or Firm—Wenderoth, Lind & Ponack, L.L.P.

(57) ABSTRACT

There is provided an optical element which can be handled with ease and mounted on a supporting means for supporting it with high precision and efficiency in the course of manufacturing it, and also there is provided a method for manufacturing such an optical element as described above. A lens element 100 is an optical element which is mounted on a supporting substrate provided with a groove for mounting the lens element. The lens element 100 includes a handling portion 120, a side wall 162a which are brought into contact with the groove for mounting use, and a lens portion 180a. The thickness of the lens portion 180a in the optical axis direction thereof is able to be set arbitrarily.

23 Claims, 15 Drawing Sheets

OPTICAL ELEMENT AND METHOD FOR MANUFACTURING SAME

BACKGROUND OF THE INVENTION

1. Field of the Invention

The present invention relates to an optical element such as a lens element suitably applicable to optical communication devices, tools and systems. Also, the invention relates to a method for manufacturing the optical element.

2. Prior Art

The surface mount technology (SMT) has been widely known as one of mass production technologies for producing optical modules for use in the optical communication at a low cost. According to this technology, for instance, the outward form of parts such as laser diodes, lens elements and so forth necessary for constituting the optical module are made in advance with high precision, and these mount parts are arranged on a V-shaped groove formed on the surface of a silicon substrate, with high precision of a sub-micron order. Furthermore, in some case, the parts to be mounted are given, in advance, an alignment mark for positioning thereof, taken by a CCD camera, and then arranged by means of the image recognition technology. In case of using these technologies, however, as the parts are arranged without monitoring the quantity of light incident on the optical fiber, the manufacturing precision and the positioning precision give a certain influence to the quantity of light finally incident on the optical fiber. Therefore, it is very needed to manufacture and align each part with high precision.

The lens element usable in SMT has a comparatively large external dimension, for instance, 1 mm or so in terms of the outward diameter. Also, in case of those which are formed by the embossing process, the necessary precision can be hardly obtained, thus undesirable problems to the surface mount being caused.

Recently, there has been devised a micro-lens manufactured by using the photolithographic etching process. In case of lens of this kind, however, as there is a certain limitation with regard to the dimension in the direction of the optical axis of the lens, the lens size can not help becoming small, thus the handling of it becoming more difficult.

SUMMARY OF THE INVENTION

The invention has been made in view of the problems as described above, and an object of the invention is to provide an optical element which can be handled with ease and mounted on a supporting means for supporting it with high precision and efficiency, and also to provide a method for manufacturing such an optical element as described above.

In order to solve the problems as mentioned above, according to the first aspect of the invention, there is provided a method for manufacturing an optical element which is mounted on a supporting substrate having a groove for use in mounting the optical element thereon. This method includes the manufacturing steps as will be described in the following. First of all, at least one light beam conversion portion is formed on one surface of an optical substrate. In the next, the first groove portion is provided by removing a predetermined region on one side of the periphery of the light beam conversion portion up to a predetermined depth from the surface of the predetermined region. With this, there are formed an edge portion along a part of the periphery of the light beam conversion portion, an end face made up of the edge portion and a part of the light beam conversion portion surrounded by the above edge portion, and the first side wall which has the periphery of the end face as the one end thereof and is made up of a part of the side wall of the first groove portion, and is formed such that it comes into contact with the mounting groove of the supporting substrate. Furthermore, the second groove portion is formed by removing a predetermined region on the other side of the optical substrate up to a predetermined depth from the surface of the above predetermined region. With this, there are formed an end face made up of a part of the surface of the optical substrate, and the second side wall which has the periphery of the end face as the one end thereof and is made up of a part of the side wall of the second groove portion, and is formed such that it comes into contact with the mounting groove of the supporting substrate. Still further, the optical substrate is cut along a predetermined cutting line, thereby obtaining an optical element which is provided with at least one light beam conversion portion and the first side wall corresponding to the light beam conversion portion, at least one second side wall, a side face formed of a part of the bottom face of the first groove portion, a side face formed of a part of the bottom face of the second groove portion, and the side face formed of a part of the surface of the optical substrate.

Here, the light beam conversion portion means those which have the function of converting the light beam, for instance, the function of converging, diverging, reflecting, deflecting the light beam. Also, depending on the arrangement condition of it, the light beam conversion portion includes those which convert the incident light beam into parallel light rays, or split the incident light beam into a plurality of light beams. The lens, diffractive optical element, and so forth are concrete examples of the light beam conversion portion.

The optical substrate may be formed by means of a crystalline substrate such as a silicon crystal substrate. The crystalline substrate may be formed by using materials other than silicon, for instance, GaAs, InP, GaP, SiC, Ge and so forth.

According to the constitution as described above, it is possible to manufacture an optical element which is able to have an arbitrary thickness in the direction vertical to the surface of the light beam conversion portion. Furthermore, as above-mentioned manufacturing method includes the step of forming the side wall having a shape capable of coming into contact with the groove for mounting use, it becomes possible to manufacture an optical element which can be mounted and arranged on its supporting means with ease, high precision, and high efficiency.

Furthermore, according to the second aspect of the invention, there is provided an optical element including a handling portion having the first side face and the second side face opposing to the first side face; a thin thickness portion extending from the handling portion, having the first stepped face with a step as formed to inwardly direct to the first side face and the second stepped face with a step as formed to inwardly directing to the second side face, each of the first and second stepped faces being constituted as side faces thereof; the first projection portion having the first end face extended from the first side face, the first side wall of which one end is located on the first end face while the other end thereof is located on the first stepped face, and projecting in a boundary face between the first side face and the first stepped face; the second projection portion having the second end face extended from the second side face, the second side wall of which one end is located on the second end face while the other end thereof is located on the second stepped face, and projecting in a boundary face between the second side face and the second stepped face; and a light beam conversion portion is formed in a predetermined part of a region spreading over the first end face and the first side face portion in the vicinity thereof.

According to such a constitution of the optical element as described above, as the optical element is provided with a handling portion, the handling of the optical element is very much facilitated in the mounting process of it.

BRIEF DESCRIPTION OF THE DRAWINGS

The invention will now be described in detail with reference to the accompanying drawings, wherein constituents of the invention having almost like function and structure will be denoted with like reference numerals and characters in order to avoid the redundant repetitive description. In the accompanying drawings:

FIGS. 1A through 1C are diagrams showing the constitution of a lens element according to the first embodiment of the invention, wherein FIG. 1A is a perspective view of the lens element, FIG. 1B is a side view of the same, and FIG. 1C is a bottom view of the same;

DETAILED DESCRIPTION OF THE PREFERRED EMBODIMENTS

Figure 1A:
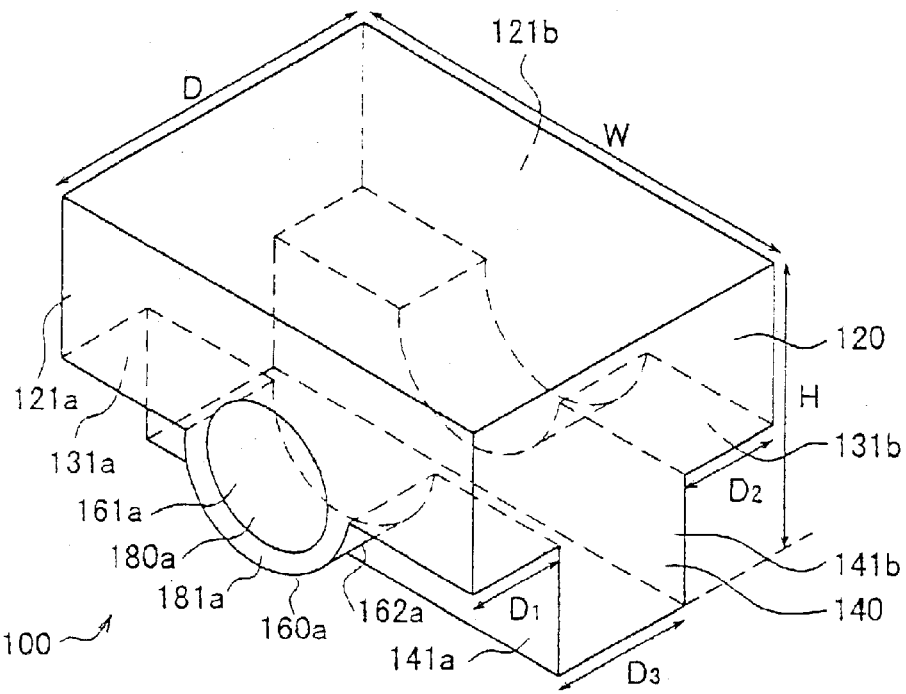
Figure 1B:
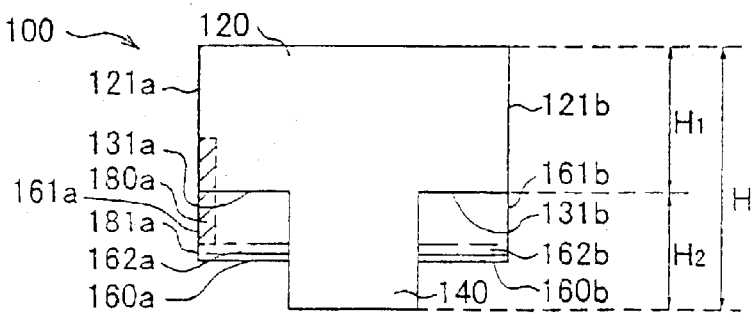
Figure 1C:
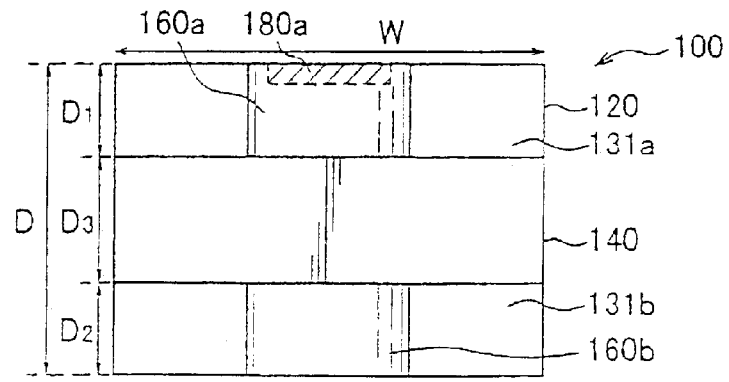

FIGS. 1A through 1C are diagrams showing the constitution of a lens element according to the first embodiment of the invention, wherein FIG. 1A is a perspective view of the lens element, FIG. 1B is a side view of the same, and FIG. 1C is a bottom view of the same. A lens element 100 is formed of an optical substrate and is mounted on a supporting substrate provided with a groove portion, with the help of which the lens element is mounted on the supporting substrate. As will be seen from these figures, the lens element 100 has a width of W, a height of H, and a depth or thickness changing in the step-like manner, that is, it taking a value D in one part and a value $D_3$ in the other. As shown in FIG. 1B, the side face of the of the lens element 100 shows a shape resembling a letter T when seeing it in its width W direction. The lens element 100 are made up of its main components which are a handling portion 120 having the shape of an approximately rectangular parallelepiped, a thin thickness portion 140 thinner than the handling portion 120, projection portions 160a and 160b, and a lens portion 180a formed on the surface of the optical substrate.

As shown FIGS. 1A through 1C, the handling portion 120 is formed in the shape an approximately equal to a rectangular parallelepiped with a width of W, a height of H, and the thickness of D. The handling portion 120 has two side faces 121a and 121b which are vertical to the direction of the thickness D and opposes face-to-face to each other. The handling portion 120 is provided to facilitate the handling of the lens element 100 in the process of mounting it and so forth. The thin thickness portion 140 is provided to extend under the handling portion 120.

The thin thickness portion 140 has the shape approximately equal to a rectangular parallelepiped with a width of W, a height of H, and a thickness of $D_3$. The thin thickness portion 140 has two side faces 141a and 141b, which respectively form step-wise side faces of step heights $D_1$ and $D_2$ in combination with side faces 121a and 121b. In this case, both of the step heights $D_1$ and $D_2$ are formed so as to direct to the inside of the lens element 100, so that the thickness of the thin thickness portion 140 becomes $D_3 = D - D_1 - D_2$, thus it becoming thinner than that of the handling portion 120. Consequently, when seeing the lens element 100 having the handling portion 120 and the thin thickness potion 140 in the direction of its width W, the side face of the lens element 100 shows a shape roughly equal to a letter T. Due to projection portions 160a and 160b which will be described later, each of side faces 141a and 141b has such a shape that is obtained by removing an approximately semicircular shape from an approximately rectangular shape, the semicircular shape being about a half of a circular shape which places its center and diameter on one edge of the rectangular shape.

A boundary plane 131a vertical to the side face 121a is formed at the boundary between the side faces 121a and 141a having a difference in their levels while a boundary plane 131b vertical to the side face 121b is formed at the boundary between the side faces 121b and 141b. Projection portions 160a and 160b respectively project from the handling portion 120 in near the center portion of boundary planes 131a and 131b.

The projection portion 160a has an end face 161a and a side wall 162a and has a roughly semi-cylindrical shape. The end face 161a is extended from the side face 121a so as to be on the same plane as the side face 121a and has an approximately semi-circular shape. The side wall 162a is constituted such that one end of it starts from the circular arc shaped outer periphery of the end face 161a which is approximately vertical to the side wall 162a and the other end terminates on the side face 141a by inwardly extending the circular arc shape without changing its dimension by a distance of $D_1$ in the direction of the thickness D. It may be possible, if needed, to make the dimension of the circular arc shape of the side wall 162a variable, for instance it may be possible to give a certain slant to the extending circular arc shape over the thickness of $D_1$.

The projection portion 160b has an end face 161b and a side wall 162b and has a roughly semi-cylindrical shape. The end face 161b is extended from the side face 121b so as to be on the same plane as the side face 121b and has an approximately semi-circular shape. The side wall 162b is constituted such that one end of it starts from the circular arc shaped outer periphery of the end face 161b which is approximately vertical to the side wall 162b and the other end terminates on the side face 141b by inwardly extending the circular arc shape without changing its dimension by a distance of $D_2$ in the direction of the thickness D. It may be possible, if needed, to make the dimension of the circular arc shape of the side wall 162b variable, for instance it may be possible to give a certain slant to the extending circular arc shape over the thickness of $D_2$.

Both of side walls 162a and 162b serve as portions for fitting themselves to corresponding grooves for mounting use when mounting the lens element 100 on the supporting substrate having such grooves and are also used for positioning. It would be convenient if the dimension of the side walls 162a and 162b is selected to coincide with the outside diameter of an optical fiber to be connected with the lens element 100 when mounting the lens element 100 on the supporting substrate, for instance the dimension of side walls 162a and 162b may be selected to meet the optical fiber with the outside diameter of Φ125 μm.

In this first embodiment, the lens portion 180a has a circular shape and is formed extending from the end face 161a to the side face 121a such that an upper half of the circular shape is formed on the side face 121a and a lower half of the same is formed on the end face 161a. To put it more in detail, the handling portion 120 is provided such that it surrounds the upper side of the outer periphery of the lens portion 180a and the lens portion 180a is located at the middle part between both ends of the handling portion 120. The side face 121a is approximately in parallel with the surface of the lens portion 180a and has a width wilder than that of the lens portion 180a. An edge portion 181a having a circular arc shape along the outer periphery of the lens portion 180a is formed on the lower side of the outer periphery of the lens portion 180a, and the end face 161a is constituted by the lower side of the lens portion 180a and the edge portion 181a.

In the above description, it is stated that the circle center of the lens portion 180a is located around the boundary portion between the end face 161a and the side face 121a. This description is not restrictive. The circle center of the lens portion 180a may be located at a position shifted upwardly or downwardly in comparison with the position as described in the above. Furthermore, in the above description, it is stated that the edge portion 181a is provided to surround the lens portion 180a. However, it is possible to have the outer periphery of the lens portion 180a constituted the edge portion 181a.

The lens portion 180a is formed on the surface of the optical substrate and is made up a diffractive optical element. The lens portion 180a may be formed as a Computer Generated Holographic (CGH) optical element, which is one of diffractive optical elements. The CGH optical element is formed according to the following method, which includes the steps of first designing, with aid of the computer, a photomask pattern necessary for obtaining a desired optical characteristic based on the optical-path difference function of an optical element having a desired optical characteristic, applying the mask pattern to a desired part on the surface of the optical substrate, and applying a etching process to that part, thereby forming an optical element of the diffraction type having a desired optical characteristic.

A crystalline substrate can be used as an optical substrate for forming the lens element 100. Especially, if the wave length of the light source of an optical system, to which the lens element 100 is applied, is 1.3 μm or 1.51 μm, a silicon crystal substrate can be used as the optical substrate.

In the following, a method for manufacturing the lens element 100 will be explained by way of an example with reference to FIGS. 2 and 3. FIGS. 2A through 2D are typical diagrams showing the steps of manufacturing the lens element as shown in FIGS. 1A through 1C. FIGS. 3A through 3C are sectional views taken along each line III—III of FIGS. 2A through 2C. First of all, a silicon substrate 10 with a thickness of D is prepared as an optical substrate. For instance, there is prepared a silicon substrate with a diameter of 4-inch. The thickness D of the silicon substrate 10 may be arbitrarily set to be a value of 500 through 600 μm, for instance. After that, the lens element 100 is manufactured according to the manufacturing steps (i) through (iv) as described below.

Figure 2A:
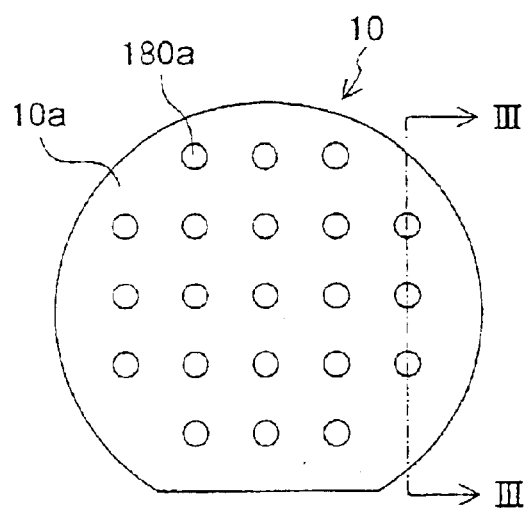
FIGS. 2A through 2D are typical diagrams for explaining the steps of manufacturing the lens element as shown in FIGS. 1A through 1C.
Figure 3A:
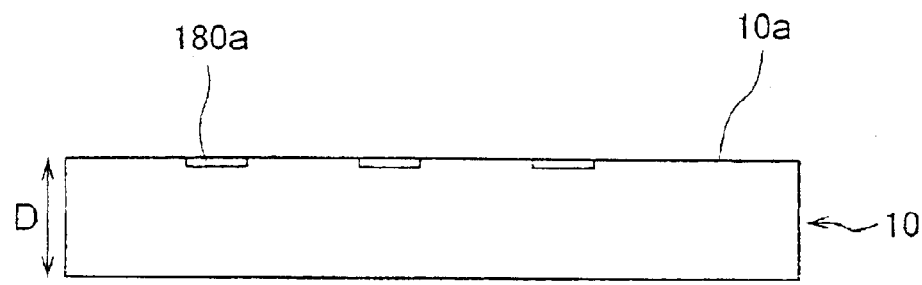
FIGS. 3A through 3C are sectional views taken on each line III—III of FIGS. 2A, 2B, and 2C.

(i) At first, as shown in FIG. 2A, a plurality of lens portions 180a is formed on the surface 10a of the silicon substrate 10 such that they make a plurality of rows and columns with a predetermined interval. FIG. 2A is a plan view of the surface 10a of the silicon substrate 10. FIG. 3A is a sectional view taken on line III—III of FIG. 2A. In the formation of the lens portion 180a, it is possible to chemically treat the surface 10a of the silicon substrate 10 by a certain suitable method, for instance the photolithographic etching method used in the semiconductor manufacturing process. With this method, a lot of lens portions 180a having a desired optical characteristic can be collectively formed with high precision.

Figure 2B:
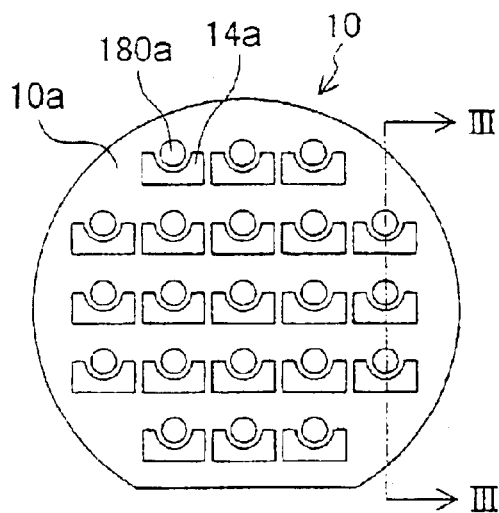
Figure 3B:
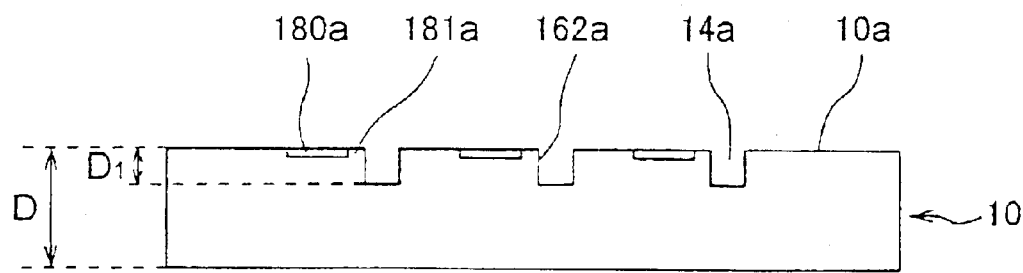

(ii) In the next, as shown in FIG. 2B and FIG. 3B, a groove portion 14a having a depth of $D_1$ from the surface 10a is formed around the one side of each lens portion 180a. FIG. 2B is a plan view of the surface 10a of the silicon substrate 10. FIG. 3B is a sectional view taken on line III—III of FIG. 2B.

A part of the bottom of the groove portion 14a constitutes the side face 141a. The shape of the groove portion 14a on the surface 10a is formed as follows. Now, let us first consider such a geometric pattern that is made up of a rectangle and a semicircle placing its center on the center of one edge of the rectangle and having its diameter on the above one edge. Then, the semicircular arc portion is removed from the above geometric pattern, thereby the shape of the groove portion 14a on the surface 10a being determined. The groove portion 14a is formed by removing the above shaped region from the silicon substrate 10 up to the depth of $D_1$ from the surface 10a. In this example, the groove 14a has the edge direction of the above rectangle and the row direction of the lens portion 180 coincided with each other in order to facilitate the following manufacturing steps.

The groove portion 14a has a side wall which is formed by extending the above circular arc shaped portion in the depth direction. This side wall constitutes a side wall 162a. This circular arc shape is formed along the outer circumference of the lens portion 180a leaving a predetermined space, and this predetermined space region between the lens portion 180a and the groove portion 14a constitutes an edge portion 181a. This edge portion 181a and a part of the lens portion 180a constitute the end face 161a as described in the above. The side wall 162a and the end face 161a constitute the projection portion 160a as described in the above. Furthermore, an approximately plane-like side wall adjacent to the side wall 162a constitutes the boundary plane 131a. That is, the formation of the groove portion 14a results in the formation of various components such as side face 141a, side wall 162a, edge portion 181a, end face 161a, projection portion 160a, and boundary plane 131a.

Figure 2C:
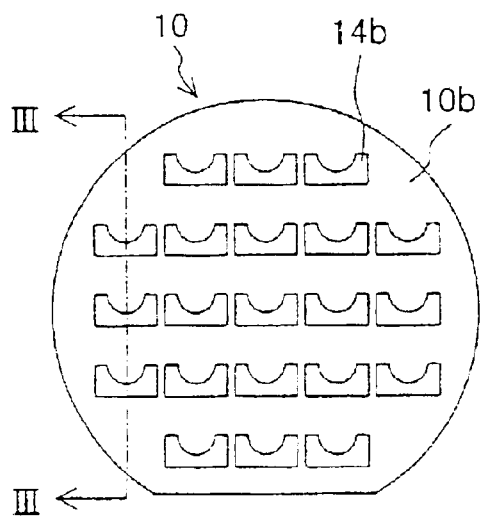
Figure 3C:
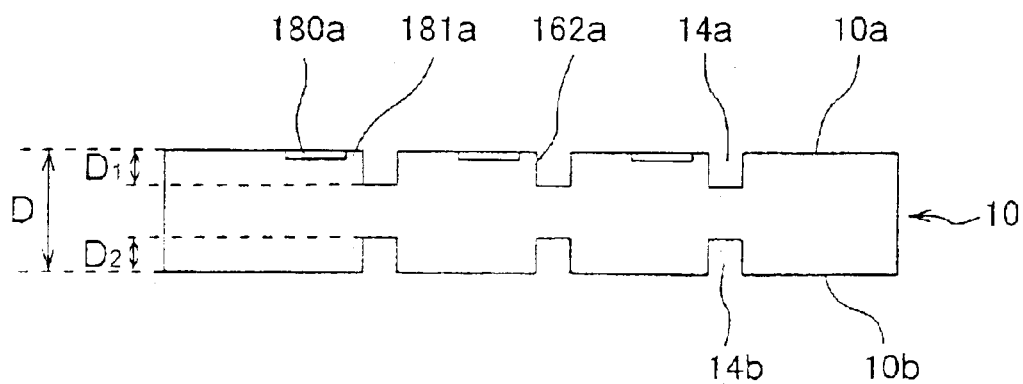

(iii) In the next, as shown in FIG. 2C and FIG. 3C, a groove portion 14b is formed on the back side 10b of the silicon substrate 10 to have a depth of $D_2$ from the surface of the back side 10b. FIG. 2C is a plan view of the back side 10b of the silicon substrate 10. FIG. 3C is a sectional view taken on line III—III of FIG. 2C. The shape of the groove portion 14b appearing on the back side 10b is identical to that of the groove portion 14a on the surface 10a and takes a position rightly opposing to the groove portion 14a. The groove portion 14b is formed by removing the above shaped region up to the depth of $D_2$ from the surface of the back side 10b. Similar to the case of the groove portion 14a, the formation of the groove portion 14b results in the formation of various components such as side face 141b, side wall 162b, end face 161b, projection portion 160b, and boundary plane 131b.

Groove portions 14a and 14b can be formed with high precision by the following steps as usually used in the semiconductor manufacturing process, that is, first forming a pattern having a form corresponding to the groove portions 14a and 14b as a photomask pattern by the photolithographic etching method and then, etching the silicon substrate by the Reactive Ion Etching (RIE) method or the like with the help of the above photomask. Furthermore, if an alignment mark for positioning use is put on both of the surface 10a and the back side 10b of the silicon substrate 10, the lens portion 180a and the groove portions 14a, 14b can be formed with highly precise positioning by using a dual mask aligner or the like.

In the manufacturing steps as mentioned above, the depth $D_1$ of the groove portion 14a and the depth $D_2$ of the groove portion 14b may be arbitrarily set within a range satisfying the relation of $D-D_1-D_2>0$. For instance, $D_1$ and $D_2$ may take a value of 100 μm through 150 μm.

Figure 2D:
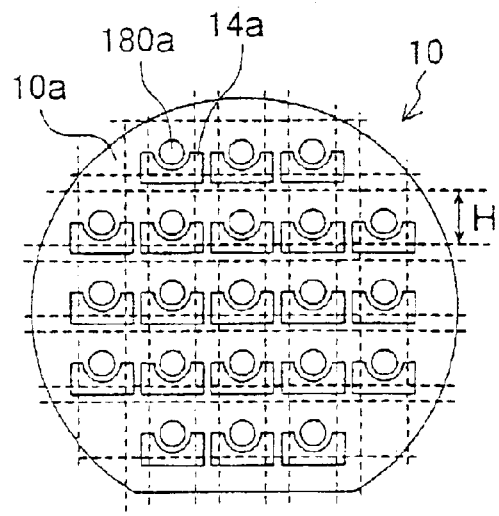

(iv) In the next, the silicon substrate 10 is cut along cutting lines indicated as dotted lines in FIG. 2D, thereby the lens element 100 as shown in FIGS. 1A through 1C being manufactured. FIG. 2D is a plan view of the surface 10a of the silicon substrate 10. As shown in FIG. 2D, the cutting line is provided in the horizontal and vertical directions to surround the four sides of each lens portion 180a. In the example shown in FIG. 2D, each lens portion 180a is provided with two cutting lines each in the horizontal (row) direction and in the vertical (column) direction as well. The first horizontal cutting line is located between the side wall 162a and the plane-like side wall of the groove portion 14a rightly opposing to the side wall 162a. The second horizontal cutting line is upwardly displaced in parallel with the first cutting line by a distance of H, which is equal to the height of the lens element 100. Two vertical cutting lines are provided such that they put the lens portion 180a therebetween and intersect the boundary plane 131a.

Sections formed by cutting along cutting lines constitute the four side faces vertical to the side face 121a and the side face 141a as well in the lens element 100. Cutting of the silicon substrate 10 can be carried out by means of dicing. As will be described later, the outward form of the lens element 100 obtained through the cutting process has nothing to do with positioning in the mounting process. Accordingly, it is not necessary to use any highly precise cutting method.

Figure 4:
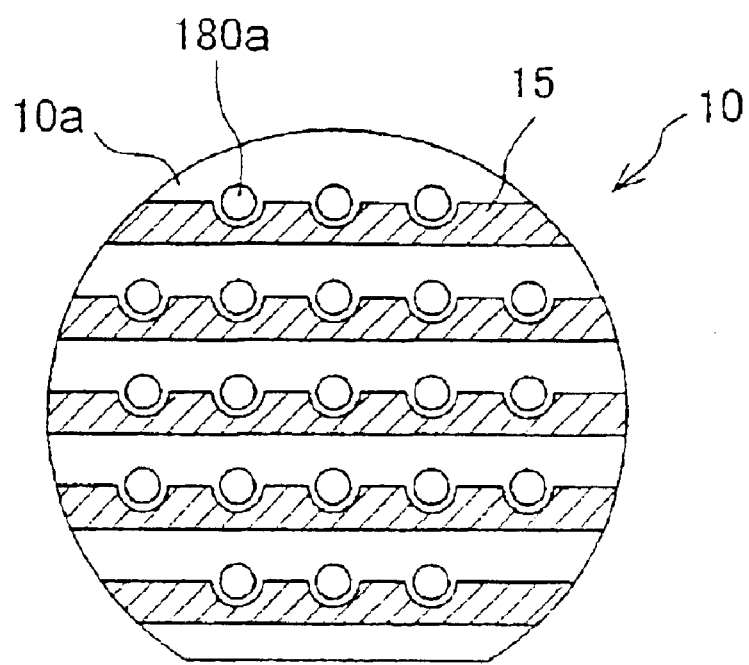
FIG. 4 is a typical diagram for explaining a variation of a groove portion.

The shape of groove portions 14a and 14b is not limited to that which is shown in the above example. For instance, they may have a shape like the hatched portion of a groove portion 15 as shown in FIG. 4, which corresponds to FIG. 2B. The groove portion 14a of FIG. 2B is separately formed for each of lens portions 180a. On one hand, the groove portion 15 has an approximately bar-like shape which connects a plurality groove portions 14a formed in one horizontal direction with each other and extends in the same horizontal direction. In this case, the groove portion 15 keeps its shape for serving as the side wall 162a around the lens portion 180a. The groove portions on the back side of the silicon substrate 10 are formed in the same way as the groove portion 15. The lens element 100 as shown in FIG. 1A is produced by cutting the silicon substrate 10 now including the necessary things formed thereon along proper cutting lines.

Figure 5:
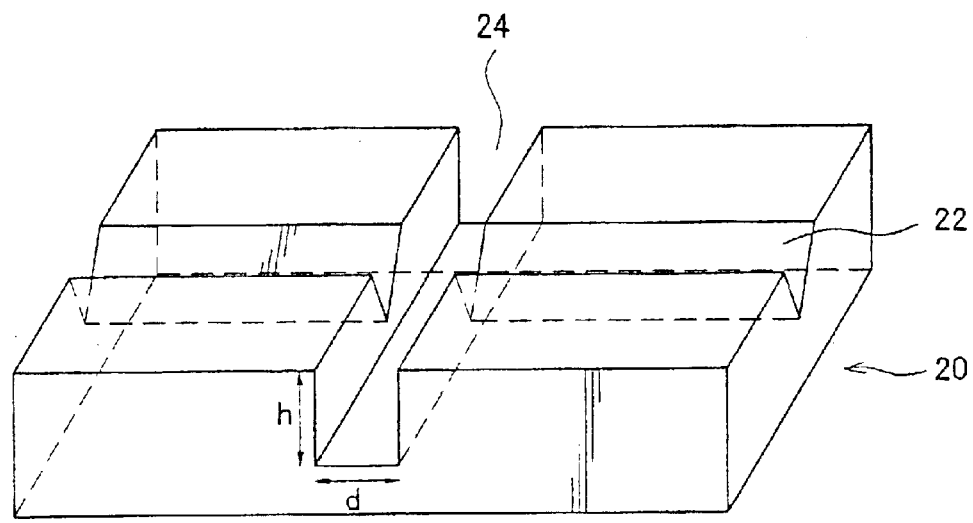
FIG. 5 is a perspective view of a supporting substrate.

An example of mounting the lens element 100 will now be described in the following with reference to FIGS. 5 and 6. FIG. 5 shows a supporting substrate 20 for use in mounting the lens element 100 thereon. The supporting substrate 20 has a V-shaped groove 22 and a dent groove 24 on its upper face. The supporting substrate 20 is made of a silicon crystal, for instance. The V-shaped groove 22 is a groove for use in mounting the lens element 100 and has a V-shaped section. This V-shaped groove 22 is formed such that two of it put the dent groove 24 (described later) therebetween and extend from one end to the other one of the supporting substrate 20, going across the dent groove 24. The V-shaped groove 22 is formed with precision of a sub-micron order by applying the anisotropic etching technique to the silicon substrate 20 and is used for positioning of the lens element 100 when mounting it. The dent groove 24 has a rectangular shaped section and is formed such that it intersects the V-shaped groove 22 at right angles and extends the one end to the other one of the supporting substrate 20. The depth "h" of the dent groove 24 is made larger than the height "$H_2$" of the thin thickness portion 140 while the width "d" of the section of the dent groove 24 is made larger than the thickness "$D_3$" of the thin thickness portion 140 but is made smaller than the thickness D ($=D_1+D_2+D_3$) of the lens element 100 even if at the maximum of it.

Figure 6:
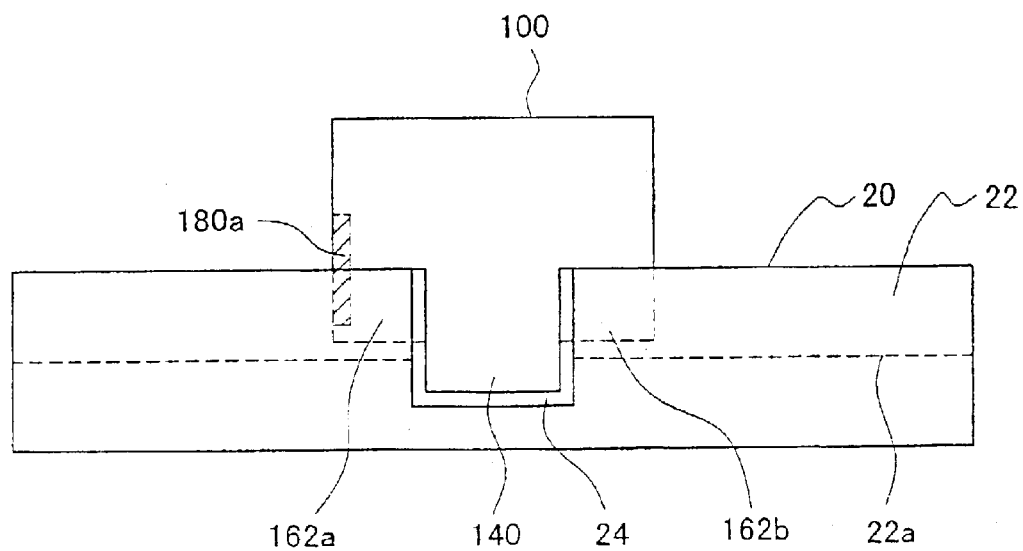
FIG. 6 is a side view showing the state wherein the lens element of FIGS. 1A through 1C has been mounted on the supporting substrate of FIG. 5.

FIG. 6 is a side view showing the case where the lens element 100 has been mounted on the supporting substrate 20. The lens element 100 is mounted on the supporting substrate 20 by bringing the side walls 162a and 162b of the projection portions 160a and 160b of the lens element 100 into contact with the side walls of the V-shaped groove 22, respectively. As the side walls 162a, 162b and the V-shaped groove 22 are formed with high precision by means of the etching treatment as mentioned above, the lens element 100 can be positioned with high precision in respect of the direction of its height H as well as the direction of its width W by just putting it on the V-shape groove 22 such that its side walls 162a and 162b are brought into contact with the V-shaped groove 22. With regard to the positioning in the thickness direction of the lens element 100, it is better to use the positioning mark. This positioning mark is provided on the supporting substrate 20. Accordingly, the highly precise positioning is achieved by arranging the lens element 100 so as to coincide with it. At the time the positioning has been completed, the supporting substrate 20 and the lens element 100 is firmly joined and fixed by means of a resin or the like.

The lens element 100 being mounted on the supporting substrate 20 as described in the above, the thin thickness portion 140 of the lens element 100 is inserted in the dent groove 24. As the thin thickness portion 140 and the dent groove 24 have no connection with positioning, the dent groove 24 may be formed by means of a comparatively low precise method, for instance dicing or the like. In FIG. 6, the deepest portion 22a of the V-shaped groove 22 is indicated with a dotted line in parallel with the bottom of the supporting substrate 20.

Figure 7:
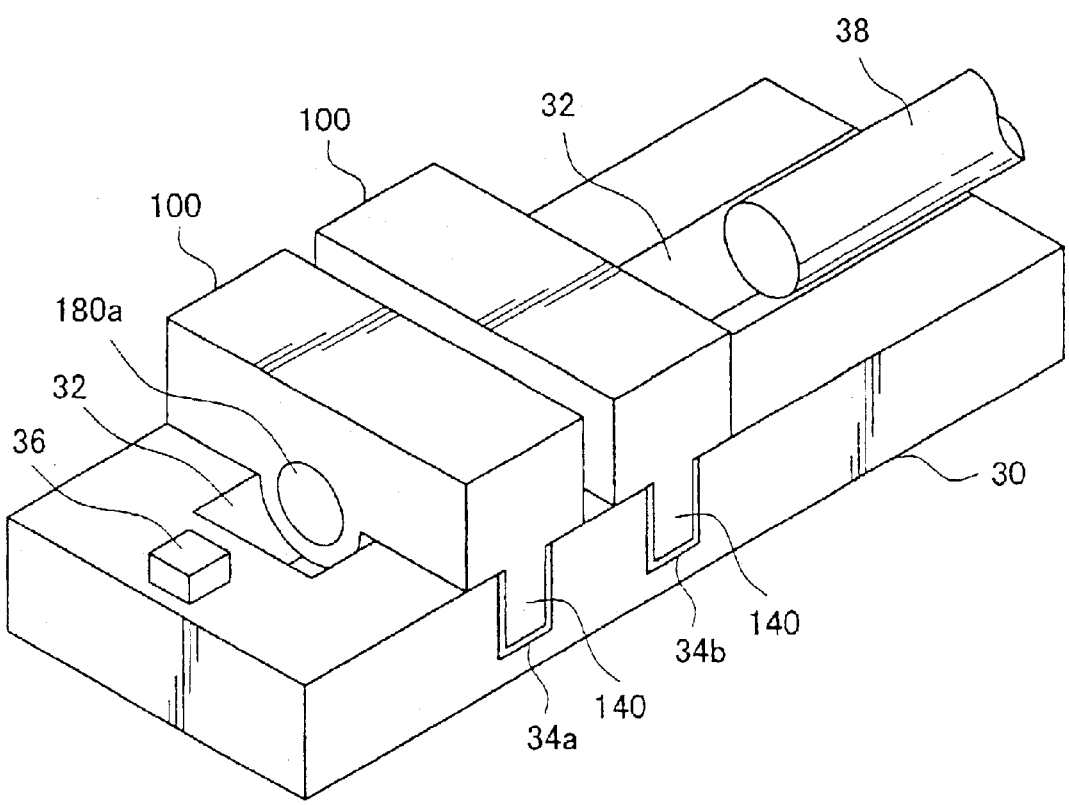
FIG. 7 is a perspective view of an optical module using the lens element of FIGS. 1A through 1C.
Figure 8:
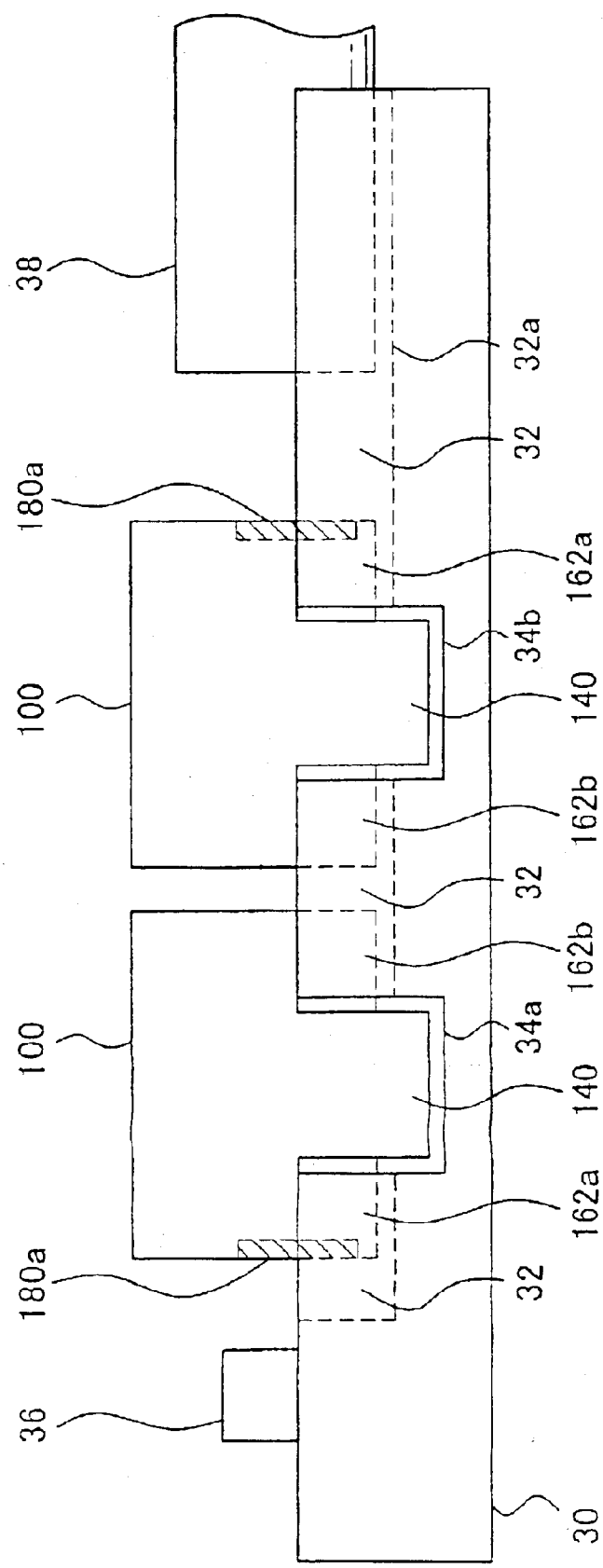
FIG. 8 is a side view of an optical module using the lens element of FIGS. 1A through 1C.

FIG. 7 and FIG. 8 are a perspective view and a side view of an optical module using the lens element 100. This optical module is made up of a supporting substrate 30, a light source 36 like a laser diode, two lens elements 100, and an optical fiber 38. The supporting substrate 30 has a V-shaped groove 32 and two dent grooves 34a and 34b, which intersect the V-shaped groove 32 at right angles, on its upper face. The supporting substrate 30 is made of silicon crystal, for instance. The V-shaped groove 32 is a groove for use in mounting the lens element 100 and has a V-shaped section. As the V-shaped groove 32 is divided into a plurality portions by dent grooves 34a and 34b, it might look like a plurality of V-shaped grooves arranged in series on a straight line. In this specification, however, these plural partial V-shaped grooves are correctively referred to as a single V-shaped groove 32. In other words, these plural partial V-shaped grooves constituting the V-shaped groove 32 hold the dent grooves 34a and 34b therebetween. Entirety of the V-shaped groove 32 is formed such that it starts from the one end of the supporting substrate 30 and terminates at a certain point before it reaches the other end of the supporting substrate 30. The dent grooves 34a and 34b have the same shape and dimension as those of the dent groove 24 as shown in FIG. 5 and are arranged in parallel at a predetermined interval.

Similar to the case as described referring to FIG. 5, the positioning of two lens elements 100 are carried out by bringing the side walls 162a and 162b into contact with the V-shaped groove 32. Two lens elements 100 being mounted on the supporting substrate 30, each thin thickness portion 140 of two lens elements 100 is inserted in the dent grooves 34a and 34b. The optical fiber 38 is arranged to bring itself into contact with the side walls of the V-shaped groove 32, thereby the positioning of it being carried out. The light source 36, two lens elements 100, and the optical fiber 38 are aligned in this order at a predetermined interval to have a common optical axis and are optically coupled with one another.

In the example as shown in FIGS. 7 and 8, the lens portion 180a of the lens element 100 located on the side of the light source 36 is arranged to face to the side of the light source 36 while the lens portion 180a of the lens element 100 located on the side of the optical fiber 38 is arranged to face to the side of the optical fiber 38. However, the direction that the lens portion faces to is not limited to this example. The light rays emitted at a certain spreading angle from the light source 36 are converted into the parallel light rays by passing through the lens portion 180a of the lens element 100 on the side of the light source 36 and propagate in the direction perpendicular to the lens portion 180a. The converted parallel light rays are condensed by the lens portion 18a of the lens element 100 on the side of the optical fiber 38 and are incident on the end face of the optical fiber 38.

In order to avoid that the light rays propagating between two lens elements 100 are reflected in part by the V-shaped groove 32, it might be preferable for the lens portion 180a of the lens element 100 to be formed by a collimating lens. Actually, however, it is not always necessary to be limited to the collimating lens so much. The minimum function the lens portion 180a is requested to have, is such a function that is able to vary the spot diameter of the light rays emitted from the light source 36 to match it with the spot diameter of the light rays incident on the optical fiber 132, thereby realizing an efficient optical coupling. In order to achieve this purpose, it is not necessary to constitute a pair of lens portions 180a by using a pair of collimating lenses. It would be enough to constitute an image formation system capable of realizing matching between the above spot diameters of the light rays.

In FIG. 8, the deepest portion 32a of the V-shaped groove 32 is indicated with a dotted line in parallel with the bottom of the supporting substrate 20. Furthermore, in the optical module according to the first embodiment, there is used the light source 36. It is possible, however, to constitute an optical module using a light receiving element such as a photodiode in place of the light source 36. In this case, the light rays propagating through the optical fiber 38 and emitted through the end face thereof are incident on the light receiving element via two lens elements 100.

As will be seen from the above description, according to the first embodiment, there can be obtained a lot of effects as described in the following. According to the first embodiment, there is provided the lens element 100 having an arbitrary thickness in the direction perpendicular to the lens portion 180a. In case of a prior art micro-lens formed by using the photolithographic etching process, for instance a micro-lens of the rod type having a lens portion provided on the end face thereof, in order to make it possible to easily take away lens element after manufacturing them, there has been used a method including the steps of forming a desired form (pattern) on a Silicon On Insulator (SOI) substrate by using the photolithographic process, and applying suitable chemical etching to the SOI substrate to remove the unnecessary portion of silicon, thereby forming the lens workable as an element. In general, however, it is thought that the thickness of the silicon layer in the SOI substrate would be 100 $\mu$m or so at the thickest. Furthermore, the value of the depth obtainable by etching would be limited to 100 $\mu$m to 200 $\mu$m even if using such a RIE method capable of etching the side wall of the lens with precision in the direction perpendicular to the substrate surface. Therefore, the dimension in the optical axial direction of the above-mentioned prior art micro-lens formed by the photolithographic method would be limited to the value of 100 $\mu$m or so. This small dimension causes difficulty in handing of the micro-lens when mounting it. To the contrary, according to the first embodiment, the thickness of the silicon substrate can be arbitrarily selected and the dimension of the lens element in the optical axial direction can be set arbitrarily, so that it becomes possible to manufacture the lens element having a larger dimension comparing to the prior art lens element. In addition, not only the handling of the lens element is made easier but also the degree of freedom in designing the lens element is considerably increased.

Furthermore, in the prior art manufacturing method of the lens element by using the SOI substrate, the back side of the lens is always covered by a quartz layer throughout the manufacturing process and is made free from the quartz layer for the first time in the final manufacturing step of dividing a plurality of lens elements formed on one substrate into an individual lens element. Consequently, in case of applying an anti-reflecting coating to both lens faces of each lens element, it is needed for the lens elements separated in pieces to be arranged such that their faces to be coated turn to the predetermined direction, and then to be put in the evaporation process. As a result, there is caused a very complex and time-consuming work. In contrast to this, according to the first embodiment, it is possible to apply the anti-reflecting coating to both surfaces of the silicon substrate 10 with ease before the above-mentioned cutting process (iv), so that there can be easily obtained the lens element of which both lens faces are coated with anti-reflecting film.

Furthermore, according to the first embodiment, as a simple silicon substrate is used, the manufacturing cost can be reduced. Still further, in case of dividing the substrate into a plurality of individual lens elements by cutting, no highly precise cutting is specially demanded, so that the cutting may be carried out by using the method of dicing or the like. Therefore, this does not become the cause of pushing up the manufacturing cost of the lens element. The lens element 100 has the side walls 162a and 162b of the projection portions 160a and 160b, which are formed with high precision by means of etching to be used for positioning of the lens element in the mounting process of it, thus the highly precise mounting being realized with ease. With the method according to the first embodiment, there are collectively manufactured a lot of lens elements which can be easily mounted with high precision.

Figure 9:
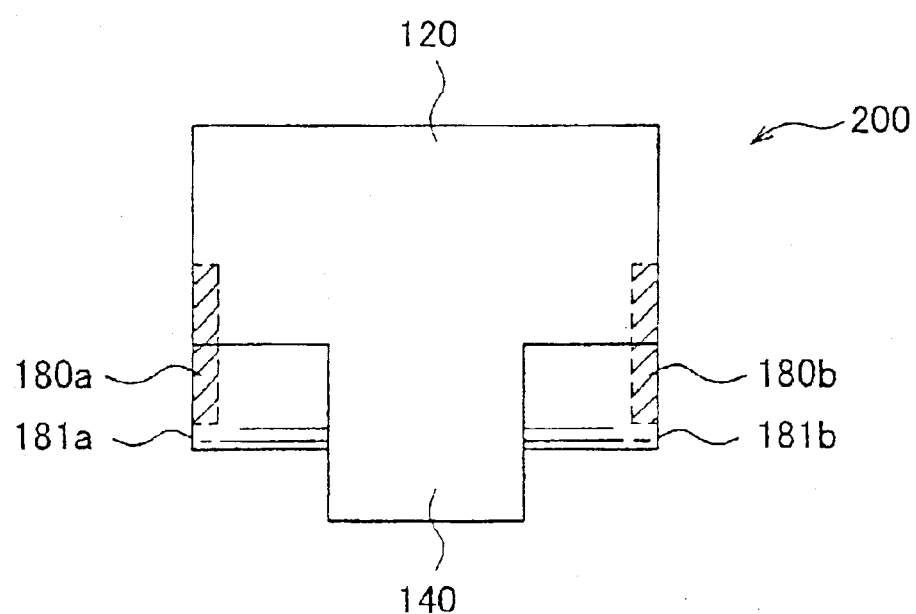
FIG. 9 is a side view showing the constitution of a lens element according to the second embodiment of the invention.

FIG. 9 is a side view showing the constitution of a lens element 200 according to the second embodiment of the invention. A lens element 200 is obtained by adding a lens portion 180b and an edge portion 181b to the lens element 100 shown in FIGS. 1A through 1C. The other constituents of the lens element 200 are very identical to those of the lens element 100, so that the iterative description thereabout will be omitted. The lens portion 180b is located to rightly oppose to the lens portion 180a and is formed to go across from the end face 161b to the side face 121b. An edge portion 181b is provided on the lower side of the lens portion 180b to rightly oppose to the edge portion 181a. The lens portion 180b has the same form and constitution as the lens portion 180a, and is made up of a diffractive optical element.

In the following, a method for manufacturing the lens element 200 will be explained by way of an example. FIGS. 10A through 10E are typical diagrams showing the steps of manufacturing the lens element and FIGS. 11A through 11D are sectional views taken along each line XI—XI of FIGS. 10A through 10D. Similar to the case of the lens element 100, there is prepared a silicon substrate 10 with a thickness of D as an optical substrate. For instance, a silicon substrate with a diameter of 4-inch may be prepared and used. The thickness D of the silicon substrate 10 may be arbitrarily set to have a value of 500 through 600 μm, for instance.

Figure 10A:
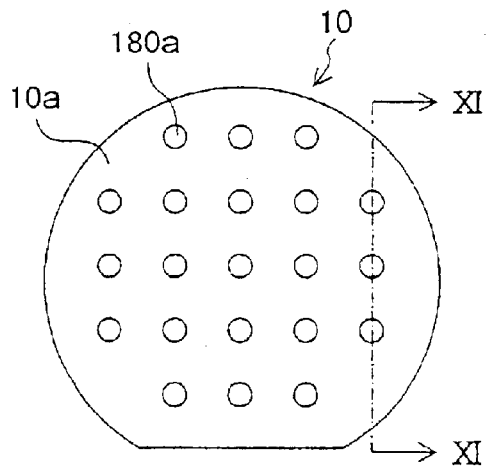
FIGS. 10A through 10E are typical diagrams for explaining the steps of manufacturing the lens element as shown in FIG. 9.
Figure 11A:
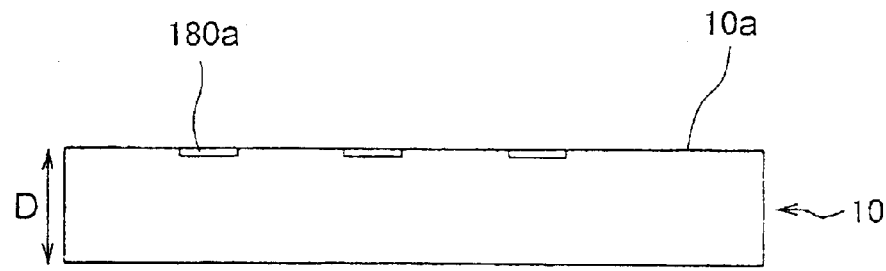
FIGS. 11A through 11D are sectional views taken on each line XI—XI of FIGS. 10A, 10B, 10C, and 10D.

After that, similar to the case of the lens element 100, a plurality of lens portion 180a is formed on the surface 10a of the silicon substrate 10 according to the manufacturing steps (i) as described above in connection with formation of the lens element 100. FIG. 10A is a plan view of the surface 10a of the silicon substrate 10 after having formed a plurality of lens portions thereon. FIG. 11A is a sectional view taken on line XI—XI of FIG. 10A.

Figure 10B:
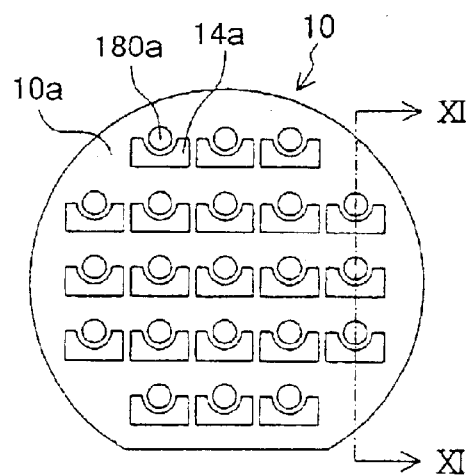
Figure 11B:
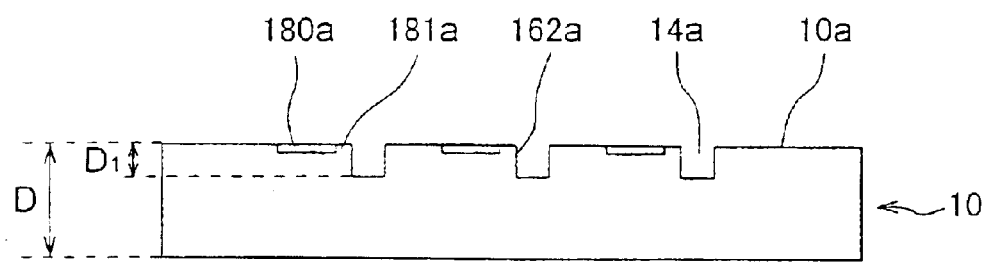

In the next, similar to the case of the lens element 100, a groove portion 14a having a depth $D_1$ is formed by removing in part the surface 10a, and a projection portion 160a including an edge portion 181a and a side wall 162 is also formed by removing in part the surface 10a according to the manufacturing step (ii) as described above. FIG. 10B is a plan view of the surface 10a of the silicon substrate 10 in this state while FIG. 11B is a sectional view taken on line XI—XI of FIG. 11B after having formed the projection portion 160a including an edge portion 181a and a side wall 162a.

Figure 10C:
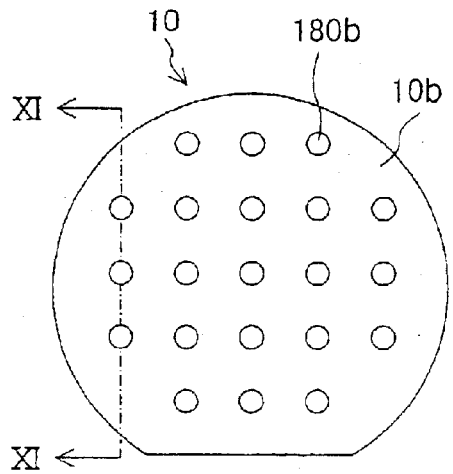
Figure 11C:
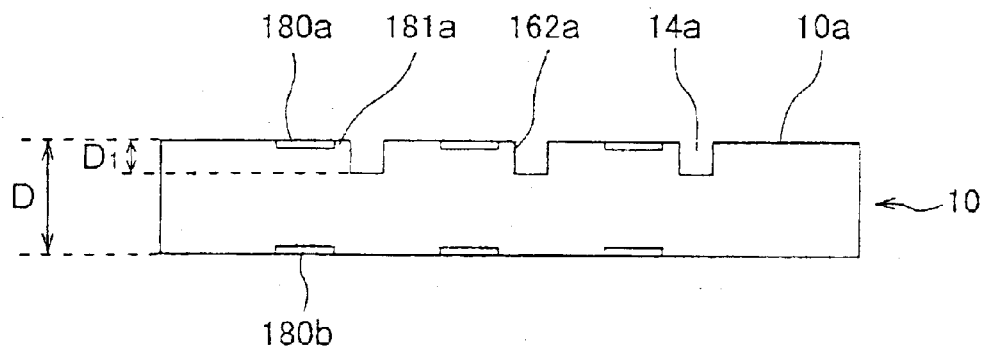

In the next, as shown in FIG. 10C, a lens portion 180b is formed on the back side 10b of the silicon substrate 10 to rightly oppose to the lens portion 180a. FIG. 10C is a plan view of the surface 10b of the silicon substrate 10 in this state while FIG. 11C is a sectional view taken on line XI—XI of FIG. 10C after having formed the lens portion 180b. In the formation of the lens portion 180b, similar to the case of forming lens portion 180a, it is possible to collectively and precisely form the lens portion 180b having a desired optical characteristic by means of applying the photolithographic technique as often used in the process of manufacturing semiconductor devices, to the surface of the back side 10b of the silicon substrate 10. The position of the lens portion 180b can be determined by first forming alignment marks for use in positioning on both of the surface 10a and the back side 10b of the silicon substrate 10 and then, by using a dual mask aligner or the like, according to the same step as the above-mentioned step (iii).

Figure 10D:
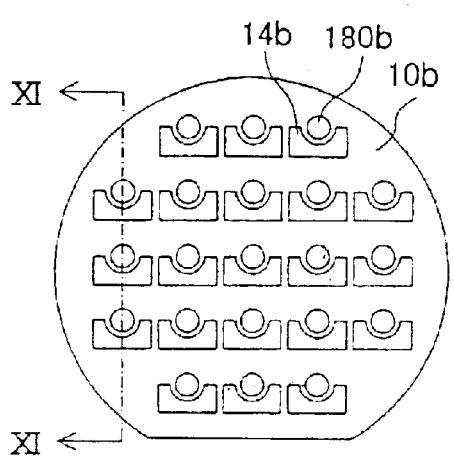
Figure 11D:
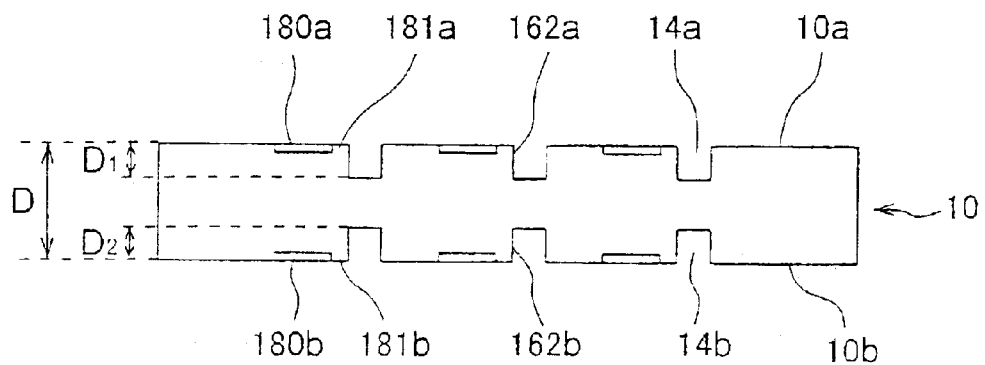

In the next, similar to the case of the lens element 100, the groove portion 14b having a depth $D_2$ is formed on the back side 10b according to the above-mentioned step (iii). Similar to the case of forming the groove portion 14a, the projection portion 160b including the edge portion 181b and the side wall 162b is formed when the groove portion 14b is formed around the lens portion 180b. FIG. 10D is a plan view of the back side 10b of the silicon substrate 10 in this state while FIG. 11D is a sectional view taken on line XI—XI of FIG. 10D after having formed the groove portion 14b.

Figure 10E:
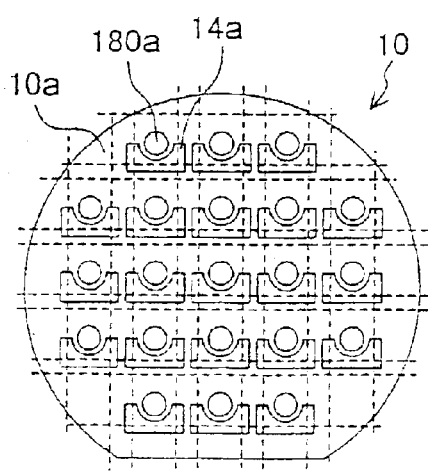

In the next, similar to the above-mentioned step (iv), the silicon substrate 10 is cut along dotted lines as shown in FIG. 10E, thereby producing a plurality of lens elements 200. In the above example, the lens portion 180b is formed after having formed the groove portion 14a. However, the formation order of the lens portion 180b and the groove portion 14a is not limited to the order as described, and it is allowed to be reversed.

Figure 12:
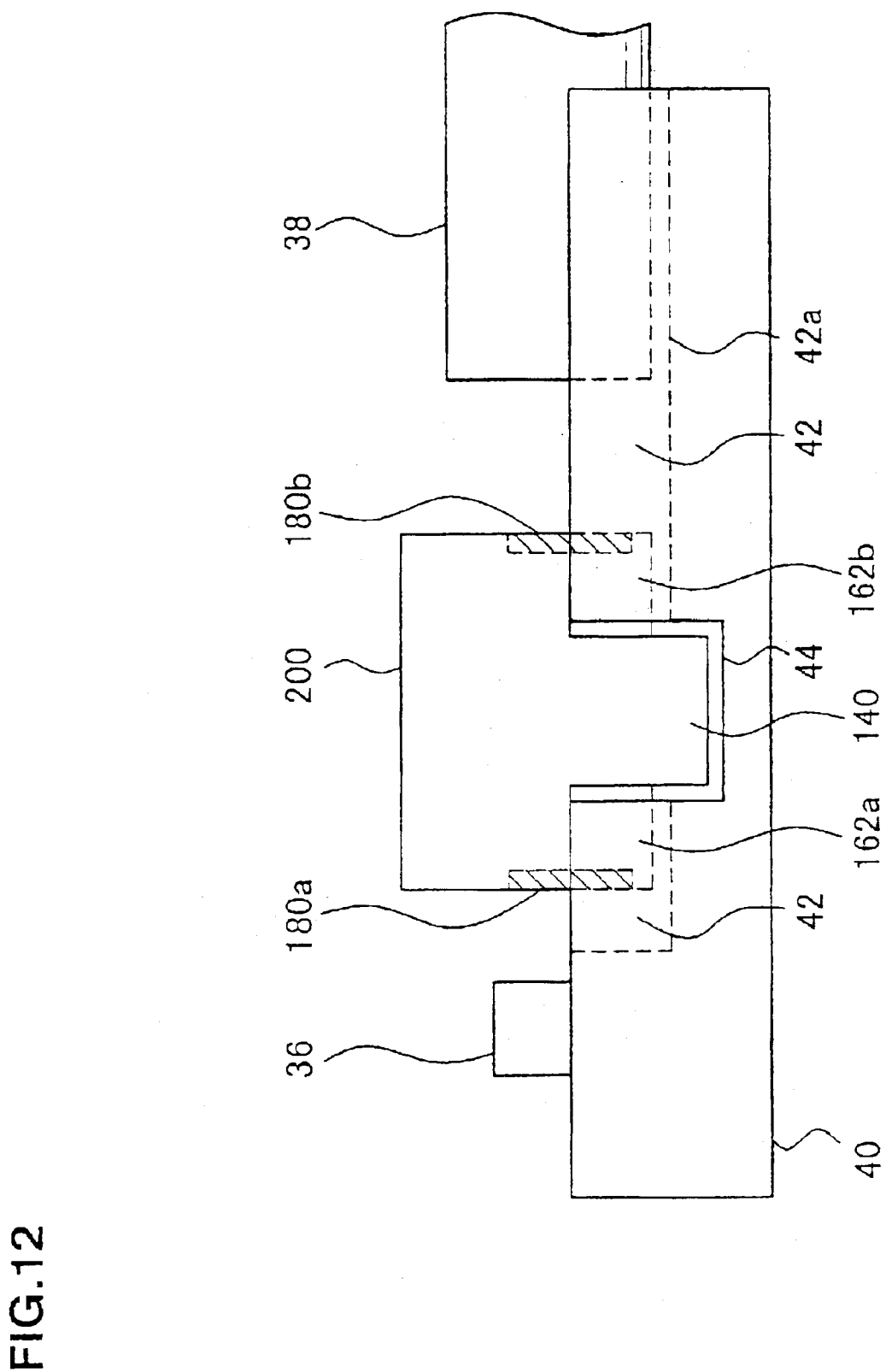
FIG. 12 is a side view of an optical module using the lens element as shown in FIG. 9.

An example of mounting the lens element 200 will now be described in the following. FIG. 12 is a side view of an optical module using the lens element 200. This optical module has an about same constitution as that which is obtained by replacing two lens elements 100 of the optical module as shown in FIGS. 7 and 8 by a single lens element 200. This optical module is made up of a supporting substrate 40, a light source 36 formed of a laser diode or the like, a lens element 200, and an optical fiber 38. The supporting substrate 40 has a V-shaped groove 42 on its upper surface and a dent groove 44 intersecting the V-shaped groove 44 at right angles. The supporting substrate 40 is formed of a silicon crystal substrate, for instance. The V-shaped groove 42 is a groove for use in mounting the lens element 200 and has a V-shaped section. As the V-shaped groove 42 is divided into two portions by dent grooves 44, it might look like two V-shaped grooves arranged in series on a straight line. In this specification, however, these two partial V-shaped grooves are correctively referred to as a single V-shaped groove 42. In other words, these two partial V-shaped grooves constituting the V-shaped groove 42 hold the dent grooves 44 therebetween. Entirety of the V-shaped groove 42 is formed such that it starts from the one end of the supporting substrate 40 and terminates at a certain point before it reaches the other end of the supporting substrate 40. The dent groove 44 has the same shape and dimension as the dent groove 24 as shown in FIG. 5.

Similar to the case as previously described referring to FIG. 5, the positioning of the lens element 200 is executed by bringing the side walls 162a and 162b of the projection portions 160a and 160b into contact with the side walls of the V-shaped groove 42. At this time, the thin thickness portion 140 is inserted in the dent groove 44. The optical fiber 38 is put on the V-shaped groove 32 such that it is brought into contact with the side walls of the V-shaped groove 32, thereby completing the positioning of the optical fiber. The light source 36, the lens elements 200, and the optical fiber 38 are aligned in this order at a predetermined interval to have a common optical axis and are optically coupled with one another.

The light rays emitted at a certain spreading angle from the light source 36 are converted into the parallel light rays by passing through the lens portion 180a of the lens element 200 and propagate in the direction perpendicular to the lens portion 180a. After passing through the inside of the lens element 200, the parallel light rays are condensed by the lens portion 180b of the lens element 200 and then, the condensed light rays are incident on the end face of the optical fiber 38. In FIG. 12, the deepest portion 42a of the V-shaped groove 42 is indicated by a dotted line in parallel with the bottom face of the supporting substrate 40. In this case, it is possible to constitute an optical module in which such a light receiving element as a photodiode is used in place of the light source 36.

As described in the above, according to the second embodiment of the invention, there is brought such an effect that the lens portion can be formed on both sides of the lens element with high precision, in addition to the effects brought by the first embodiment. As has been discussed previously, in the prior art manufacturing method of the lens element by using the SOI substrate, the back side of the lens is always covered by a quartz layer throughout the manufacturing process and is made free from the quartz layer for the first time in the final manufacturing step of dividing a plurality of lens elements formed on one substrate into an individual lens element. Therefore, according to the prior art method, it becomes very difficult to form the lens portion on each of both end faces of the micro-lens such that each optical axis of both lens portions precisely coincide with each other. Contrary to this, according to the second embodiment of the invention, as a simple silicon crystal substrate is used, it becomes possible to form the lens portion precisely positioned on each of the both end faces of the lens element.

Furthermore, in case of the lens element having a lens portion only on its one side, for instance those which are described in connection with the related prior art and first embodiment of the invention, it is necessary to have two lens elements in order to constitute an optical coupling system, for instance optically coupling the laser diode with the optical fiber. However, as the lens element according to the second embodiment has one lens portion on each of its both sides, a single lens element is enough to constitute such optical coupling system. With this, the number of parts can be reduced, thereby the time, labor, and cost for mounting the lens element being saved. Furthermore, in the lens element having the lens portion only on its one end, there has been such a problem that certain reflecting light rays are caused by a flat plane on which there is formed no lens portion rightly opposing to that formed on the one end of the lens element. This problem can be solved by the lens element according to the second embodiment as described above.

Figure 13:
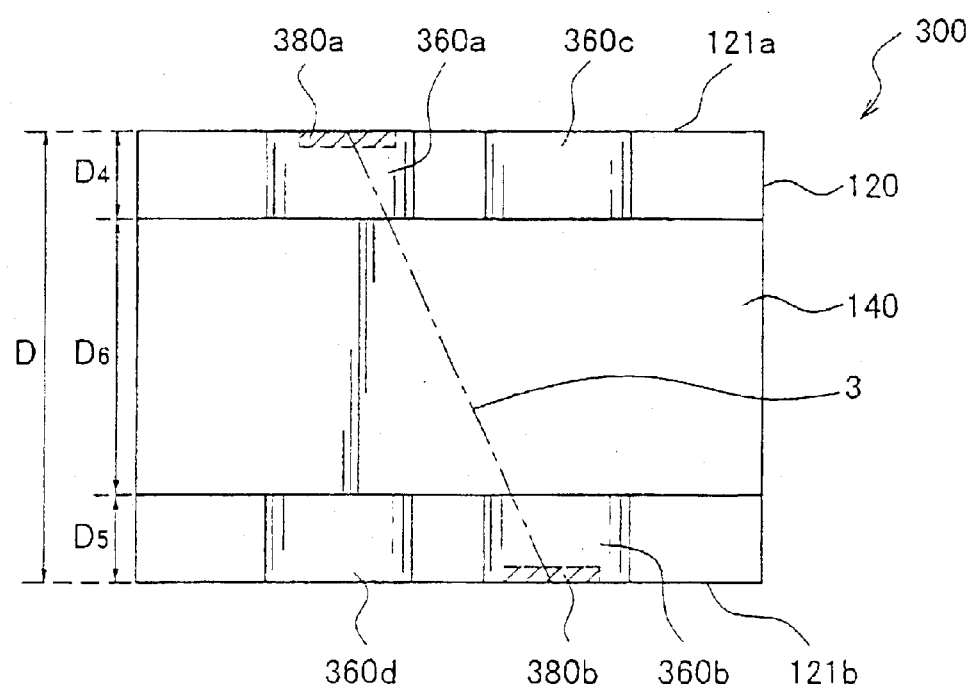
FIG. 13 is a bottom view showing the constitution of a lens element according to the third embodiment of the invention.

FIG. 13 is a bottom view showing the constitution of a lens element according to the third embodiment of the invention. As will be understood from comparison between FIG. 13 and FIG. 1C, a lens element 300 can be constituted by substituting two projection portions 360a, 360c and two projection portions 360b, 360d for projection portions 160a and 160b of the lens element 100 of the first embodiment and arranging these two groups of projection portions (360a, 360c and 360b, 360d) to be in parallel with each other at a predetermined interval. Furthermore, those which correspond to the step heights $D_1$, $D_2$ and the thickness $D_3$ of the thin thickness portion 140 in the lens element 100 are indicated as $D_4$, $D_5$, and $D_6$ in the lens element 300, respectively. However, the thickness $D_6$ of the thin thickness portion 140 of he lens element 300 is made thicker than the thickness $D_3$ in the lens element 100 shown in FIG. 1C. As the constitution of the lens element 300 is the same as that of the lens element 100 except the abovementioned, the repetitive description on the like constitution is omitted.

All the projection portions 360a, 360c and 360b, and 360d have an approximately semi-cylindrical outward shape, the identical side wall, and the identical end face. However, lens portions 380a, 380b are formed on each end face of the projection portions 360a, 360b and the side faces 121a, 121b extending therefrom, but no lens portion is formed on each end face of the projection portions 360c, 360d and the side faces 121a, 121b extending therefrom. That is, the projection portions 360a, 360b have the same constitution as the projection portion 160a of the lens element 100 while the projection portions 360c, 360d have the same constitution as the projection portion 160b of the lens element 100. Furthermore, the end faces of the projection portions 360a and 360d are positioned to rightly oppose to each other while the end faces of the projection portions 360b and 360c are positioned to rightly oppose to each other. In short, the lens portions 380a and 380b do not take a position rightly opposing to each other.

Each of Lens portions 380a, 380b has the same outward shape as the lens portion 180a and is made up of a diffractive optical element. These lens portion 380a, 380b are constituted such that the light rays vertically incident on the surface of the lens portion 380a propagates along an axis 3 as indicated by a one dot chain line of FIG. 13 to be incident on the lens portion 380b and then, emitted from the lens portion 380b in the direction perpendicular to the surface thereof. The axis 3 is on the line connecting the center of the lens portion 380a with the same of the lens portion 380b. Assuming that the propagating direction of light rays is reversed, that is, in the case where the lens portion 380b is on the incident side and the lens portion 380a is on the emitting side, the optical path is identical to the above. So far, it has been described that the light rays are vertically incident on and emitted from the surface of lens portions 380a and 380b, but the invention is not limited to the above description.

In the following, a method for manufacturing the lens element 300 will be explained by way of an example with reference to FIGS. 14A through 14E. FIGS. 14A through 14E are a typical diagram for explaining the steps of manufacturing a lens element 300. Similar to the case of the lens element 100, there is prepared a silicon substrate 10 with a thickness of D as an optical substrate. For instance, a silicon substrate with a diameter of 4-inch may be prepared and used. The thickness D of the silicon substrate 10 may be arbitrarily set to have a value of 500 µm through 600 µm, for instance.

Figure 14A:
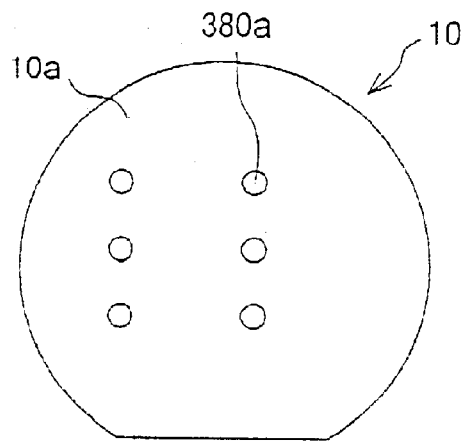
FIGS. 14A through 14E are a typical diagram for explaining the steps of manufacturing the lens element as shown in FIG. 13.

As shown in FIG. 14A, a plurality of lens portions 380a is formed on the surface 10a of the silicon substrate 10. In this figure, the interval between adjacent lens portions 380a is made about twice as wide as that between the lens portions 180a a shown in FIG. 2A. FIG. 14A is a plan view of the surface 10a of the silicon substrate 10 in this state.

Figure 14B:
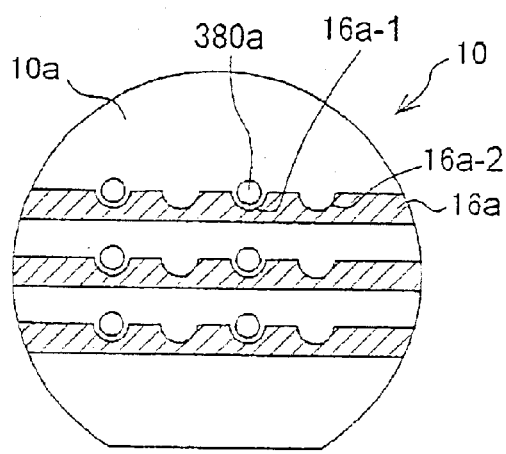

In the next, as shown in FIG. 14B, a plurality of groove portions 16a with the depth of $D_4$ are formed by removing in part the surface 10a of the silicon substrate 10. Each of these groove portions 16a is shown as the hatched portion in FIG. 14B. Similar to the groove portion 15 as shown in FIG. 4, the groove portion 16a has an approximately bar-like shape extending in the horizontal direction. The groove portion 16a has a circular arc shaped side wall at the first and second positions 16a-1 and 16a-2. The first position 16a-1 is at a predetermined distance apart from the lens portion 380a in the vertical direction while the second position 16a-2 is at a predetermined distance apart from the first position 16a-1 in the horizontal direction but has no lens portion 380a in the vertical direction. These first and second position 16a-1 and 16a-2 are alternately arranged. Similar to the case as described previously, the formation of the groove portion 16a results in the formation of projection portions 360a and 360b. FIG. 14B is a plan view of the surface 10a of the silicon substrate 10 in this state.

Figure 14C:
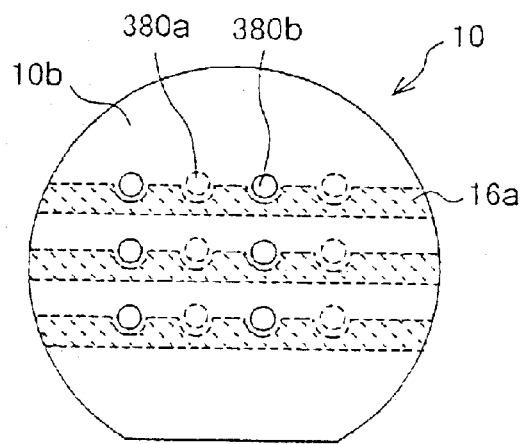

In the next, as shown in FIG. 14C, a plurality of lens portions 380b is formed on the back side 10b of the silicon substrate 10. When seeing through the silicon substrate 10 as shown in FIG. 14C, each of lens portions 380b is formed and located between adjacent lens portions 380a as formed on the surface 10a such that the circular shaped periphery of the lens portion 380b runs along the circular arc shaped side wall at the second position 16a-2 of the groove portion 16a. FIG. 14C is a plan view of the back side 10b of the silicon substrate 10 in this state. In this figure, the lens portions 380a formed on the side of the surface 10a are indicated with a dotted line while the groove portion 16a is indicated with the dot-hatched portion.

In the formation of the lens portions 380a and 380b, it is possible to chemically treat the surface 10a (or back side surface) of the silicon substrate 10 by a certain suitable method, for instance the photolithographic etching method used in the semiconductor manufacturing process. With this method, a lot of lens portions 380a (or 380b) having a desired optical characteristic can be collectively formed with high precision.

Figure 14D:
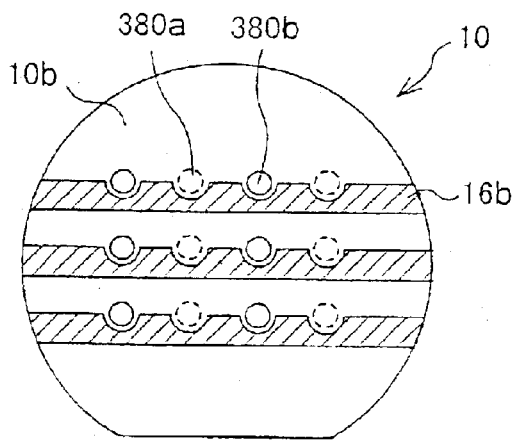

In the next, as shown in FIG. 14D, the groove portion 16b having a depth $D_5$ is formed on the back side 10b. In FIG. 14D, the groove portion 16b is indicated with the hatched portion. The groove portion 16b is located to rightly oppose to the groove 16a and the shape of the groove 16b on the back side surface 10b is identical to that of the groove portion 16a. Similar to the case as described above, the projection portions 360b and 360d are formed by forming the groove portion 16b. FIG. 14D is a plan view of the back side 10b of the silicon substrate 10 in this state. In FIG. 14D, the lens portions 380a formed on the side of the surface 10a are indicated with dotted lines.

Groove portions 16a and 16b can be manufactured with high precision by making use of the technique as used in the semiconductor manufacturing process, for instance first forming a pattern of the form corresponding to groove portions 16a and 16b as a photomask pattern on the silicon substrate 10 by means of the photolithographic etching method and then, carrying out the etching treatment over, the masked silicon substrate by using the RIE method. Furthermore, if an alignment mark for positioning use is put on both of the surface 10a and the back side 10b of the silicon substrate 10, the lens portion 380a, 380b and the groove portions 16a, 16b can be formed with highly precise positioning by using a dual mask aligner or the like.

Figure 14E:
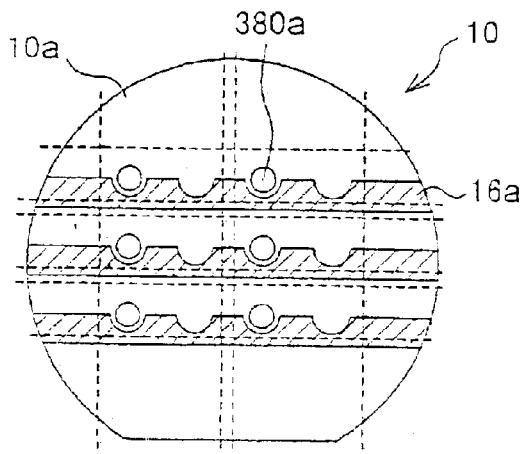

In the next, the silicon substrate 10 is cut along the cutting lines which are indicated by dotted lines as shown in FIG. 14E, thereby the lens element 300 as shown in FIG. 13 being manufactured. FIG. 14E is a plan view of the surface 10a of the silicon substrate 10 in this state and the groove portion 16a is indicated with the hatched portion.

Figure 15:
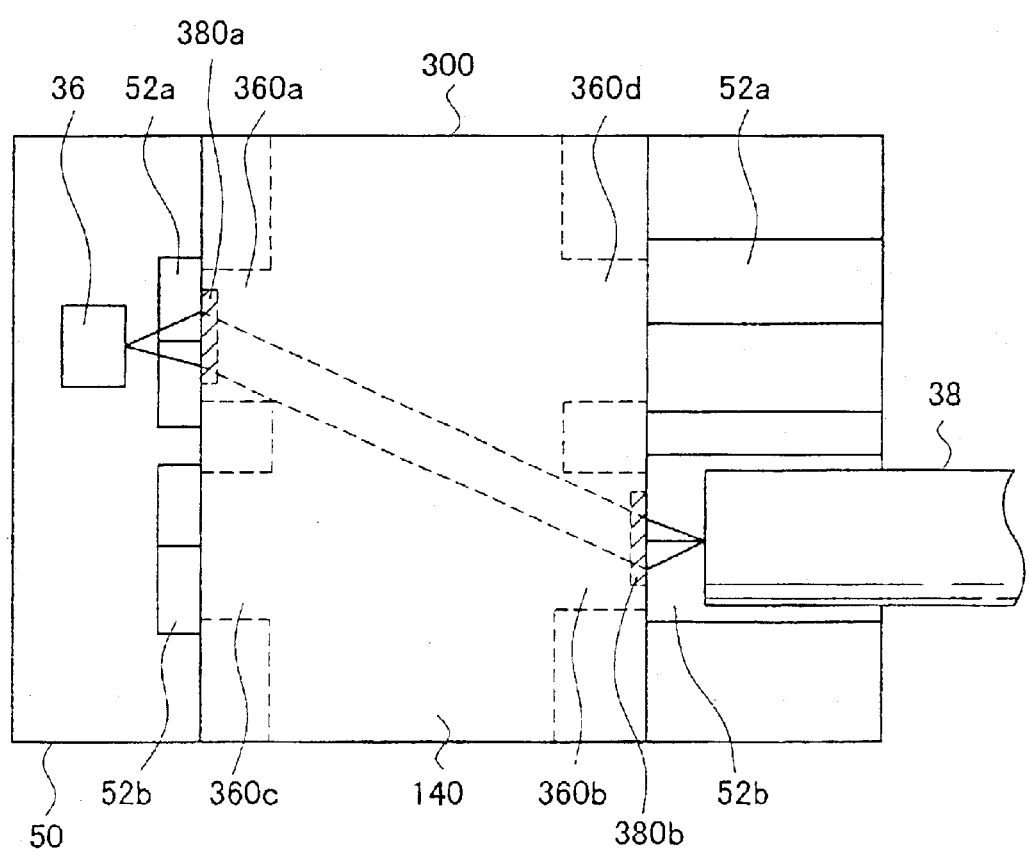
FIG. 15 is a top view of an optical module using the lens element of FIG. 13.

FIG. 15 is a diagram showing the upper side of an optical module using the lens element 300. This optical module is made up of supporting substrate 50, a light source 36 such as a laser diode or the like, a lens element 300, and an optical fiber 38. The supporting substrate 50 has two V-shaped grooves 52a, 52b and a dent groove on its upper surface. The dent groove intersects two V-shaped grooves 52a, 52b at right angles. The thin thickness portion 140 of the lens element 300 is inserted in the dent groove, so that FIG. 15 does not show the dent groove. The supporting substrate 50 is made of silicon crystal, for instance. The V-shaped grooves 52a and 52b are grooves for use in mounting the lens element 300 and has a V-shaped section formed by etching. Similar to the V-shaped groove 42 shown in FIG. 12, as the V-shaped groove 52a is divided into two portions by dent grooves (not shown), it might look like two partial V-shaped grooves arranged in series on a straight line. In this specification, however, these two partial V-shaped grooves are correctively referred to as a single V-shaped groove 52a. In other words, these two partial V-shaped grooves constituting the V-shaped groove 52a hold the dent grooves (not shown) therebetween. Entirety of the V-shaped groove 52a is formed such that it starts from the one end of the supporting substrate 50 and terminates at a certain point before it reaches the other end of the supporting substrate 50. Furthermore, similar to the V-shaped groove 52a, as the V-shaped groove 52b is divided into two portions by dent grooves (not shown), it might look like two partial V-shaped grooves arranged in series on a straight line. In this specification, however, these two partial V-shaped grooves are correctively referred to as a single V-shaped groove 52b. In other words, these two partial V-shaped grooves constituting the V-shaped groove 52b hold the dent grooves (not shown) therebetween. Entirety of the V-shaped groove 52b is formed such that it starts from the one end of the supporting substrate 50 and terminates at a certain point before it reaches the other end of the supporting substrate 50. The dent groove has a rectangular shaped section and the same dimension as that of the dent groove 24 as shown in FIG. 5 with regard to the depth h but has a different dimension with regard to the width d. The dent groove can be formed by dicing, for instance.

The lens element 300 is arranged on the supporting substrate 50 by bringing the side walls of the projection portions 360a and 360d into contact with the V-shaped groove 52a and also, by bringing the side walls of the projection portions 360b and 360c into contact with the V-shaped groove 52b. The side walls of projection portions 360a, 360b, 360c, and 360d and V-shaped grooves 52a and 52b are formed with high precision by means of the etching process as mentioned above, so that the lens element 300 is arranged with the highly precise positioning. The lens portions 380a and 380b are arranged to rightly oppose to the light source 36 and the optical fiber 38, respectively. In FIG. 15, the thin thickness portion 140 is in such a state that it is inserted in the dent groove.

The light rays emitted at a certain spreading angle from the light source 36 are incident on the lens portion 380a and converted into the parallel light rays by passing through the lens portion 380a. The converted parallel light rays propagate within the lens element 300 along the axis 3 as described before. Then, the parallel light rays are condensed by lens portion 380b, and finally incident on the end face of the optical fiber 38.

In the third embodiment of the invention, the propagation direction of the light rays having been incident on the surface of the lens portion 380a (or 380b) becomes not vertical but slant with respect to that surface. Therefore, according to the this embodiment, there can be obtained, in addition to the effect brought by the second invention, such an effect that the light rays reflected by the surface of the lens portion 380a (or 380b) is not returned directly to the light source 36 and the optical fiber 38. With this, there can be reduced an optical noise which has been undesirably caused so far by the light rays reflected by the surface of the lens portion in the optical coupling system.

Figure 16:
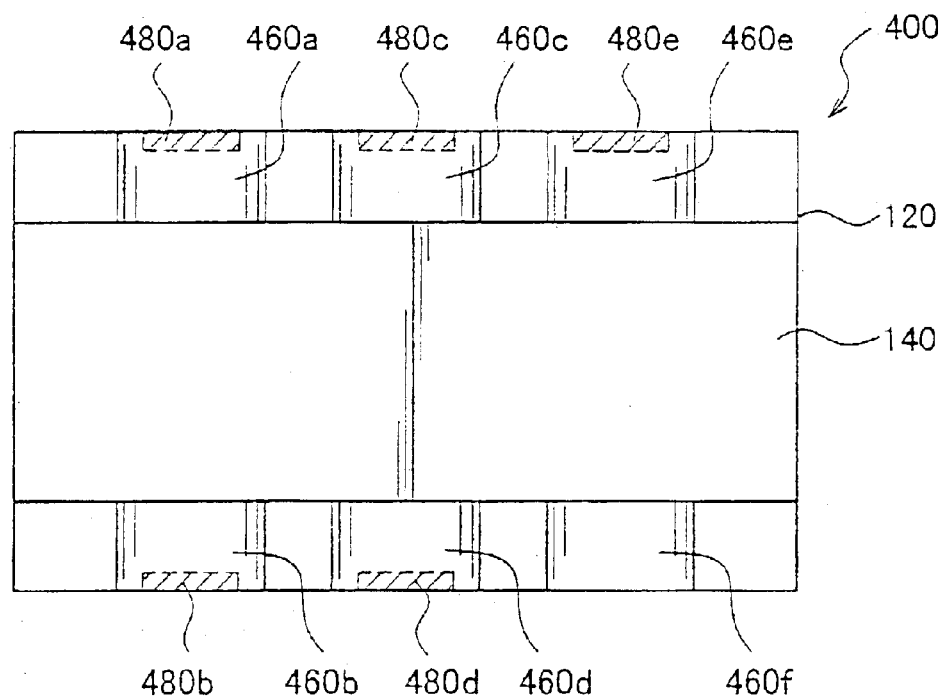
FIG. 16 is a bottom view showing the constitution of a lens element according to the fourth embodiment of the invention.

So far, the invention has been described by way of the example of the lens element wherein only one lens portion is provided per one side face. However, the invention is not limited by this example. It is possible to produce a lens element having such a constitution that one side face has a plurality of lens portions. FIG. 16 is a bottom view showing the constitution of a lens element 400 according to the fourth embodiment of the invention. The constitution of the lens element 400 is the same as that of the lens element 300 except the number of the lens portions and the projection portions as formed. Accordingly, there will be omitted the repetitive description about the like constitution.

The lens element 400 has three lens portions 480a, 480c, and 480e on one side face and two lens portions 480b and 480d on the other side face rightly opposing to the above one side face. Similar to the lens elements as previously described, each of lens portions 480a, 480c, and 480e is formed from each end face of projection portions 460a, 460c, and 460e toward the side faces continuously extending therefrom. In the same way, each of lens portions 480b and 480d is formed from each end face of projection portions 460b and 460d toward the side faces continuously extending therefrom. The lens element 400 is provided with a projection portion 460f, which stands in a line with projection portions 460b and 460d but has no lens portion.

The method for manufacturing the lens element 300 is applicable to the lens element 400. For instance, in case of manufacturing the lens element 400 by using the manufacturing process for the lens element 300 as shown in FIG. 14A, there are formed on the surface 10a of the silicon substrate 10 a lot of lens portions more than those (380a) in case of the lens element 300. In the next, the projection portions corresponding to lens portions as formed are formed by a manufacturing step equivalent to the step shown in FIG. 14B. After this, the position of the lens portion to be formed and the cutting position are properly determined, and then, the manufacturing steps are executed in the same way as the case of the lens element 300. With the method as described above, the lens element 400 can be manufactured with ease.

As described above, with the application of the invention, it becomes possible to manufacture the lens element having a plurality of the lens portions on its one side face with ease. The number of lens portions and projection portions which one lens element is able to have, is not limited to the above-mentioned example. The lens element may be constituted such that it has a larger number of lens portions and projection portions than the example. In case of the lens element having a plurality of projection portions, it may be freely determined which projection portion is provided with the lens portion. For instance, it is possible to adopt such a constitution that at least one lens portion is formed on one side face of the projection portion while no lens portion is formed on the other side face of the same. It is also possible to freely set the constitution of each lens portion such that the light lays passing through the lens portion propagate in the direction vertical to or oblique to the surface of the lens portion. For instance, it is possible to consider that the lens portion formed on one side face of the lens element is constituted to have the light beam splitting and the deflection function, thereby the light rays emitted from one lens portion formed on one side face of the lens element being incident on and emitted from a plurality of lens portions formed on the other side face of the lens element.

Therefore, according to the fourth embodiment, there is produced the same effect as those which are produced by the second and third embodiments. In addition to these effects, the fourth embodiment is able to produce the effect enlarging the degree of freedom in the design of the lens element to a great extent.

Figure 17:
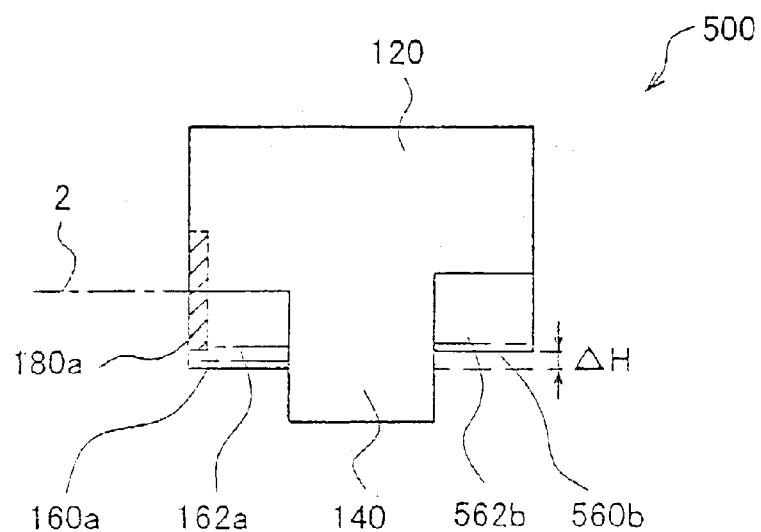
FIG. 17 is a side view showing the constitution of the variation of the lens element as shown in FIGS. 1A through 1C.

FIG. 17 is a side view showing the constitution of the lens element 500 as a variation example of the lens element 100 formed according to the first embodiment. The lens element 500 has a projection portion 560b in place of the projection 160b of the lens element 100. Other components are identical to those of the lens element 100, so that the explanation about the like components is omitted to avoid the iterative explanation thereabout. Also in the FIG. 17, reference numerals designating the constitution as shown in the FIG. 1B are omitted in part.

In the lens element 500 as the variation example, the projection portion 560b is constituted as that which is obtained by upwardly shifting the projection portion 160b of the lens element 100 by a tiny distance ΔH. In the lens element 100, the projection portions 160a and 160b are arranged to rightly oppose to each other, they have the same circular arc shaped outward form, and their lowest portions are at the same level. In comparison with this, as shown in FIG. 17, the projection portions 160a and 560b have the same circular arc shaped outward shape but, as shown in FIG. 17, the lowest portion of the projection portion 560b is at a little high level than that of the projection portion 160a, that is, by a tiny distance of ΔH. Consequently, the distance between the optical axis 2 and the side wall 162a of the projection portion 160a becomes different from the distance between the optical axis 2 and the side wall 562b of the projection portion 560b.

If the lens element 500 having the constitution like the above is used instead of the lens element 100 as shown in FIG. 7, the lens element 500 can be arranged to make a little slant with regard to the optical axis of the light source 36 or the optical fiber 38. With this arrangement, it becomes possible to prevent the light rays reflected by the lens portion 180a of the lens element 500 from being incident on the light source 36 as the returning light rays, which unfavorably makes the output of the light source unstable. According to the variation example as described above, it becomes possible to reduce the returning light rays.

Such a constitution as the above variation example that makes it possible to change the height of the projection portions rightly opposing to each other and having the same circular arc shape, is applicable to various forms according to the second, third, and fourth embodiments. In that case, there are produced the same effects as mentioned above.

The each shape of the lens portion, edge portion, handling portion, projection portion, groove portion, and so forth is not limited to those which are described in connection with several embodiments of the invention. For instance, it is not always needed for the lens portion to be a circular lens and it may be formed in a desired shape. Also the lens portion may be constituted as a refractive lens portion. In the above examples, the light beam converting portion is explained in terms of "lens portion" as a mere example of it. Also, terms of "lens element" are used merely for expressing an example among various optical elements. Accordingly, the invention should not be limited to these terms. For instance, the invention is applicable to the case where the light beam converting portion is replaced by an optical deflection portion while the optical element is replaced by an optical deflection element.

In the above examples, the projection portions formed on both side faces are arranged to oppose to each other. However, it is not always to arrange them in such manner. The position of the projection portion can be freely determined if it is within the boundary plane. Also in the above examples, the number of the projection portions provided on one side face is made equal to the number of the projection portions provided on the other side face. However, the number of these projection portions may be different from each other without being limited to the example as described above.

In the above examples, the cross section of the groove for mounting use has a V-shape. However, it is not limited only to the V-shape, and the invention is applicable to the case wherein the cross section of the groove for mounting use has either one of a roughly trapezoid shape, a roughly semicircular shape, a roughly rectangular shape, a roughly square shape, and so forth.

While preferred embodiments of the invention have been shown and described in the above with reference to the accompanying drawings, the invention is not limited to such examples. Needless to say, it will be apparent that those skilled in the art would be able to make various changes and modifications within the category of technical thoughts as recited in the scope of claim for patent attached hereto, and it is understood that those changes and modifications naturally belong to the technical category of the invention.

What is claimed is:

1. A method for manufacturing an optical element which is mounted on a supporting substrate having a groove for use in mounting the optical element thereon, comprising the steps of:

forming at least one light beam conversion portion on one surface of an optical substrate;

providing the first groove portion by removing a predetermined region on one side of the periphery of said light beam conversion portion up to a predetermined depth from the surface of the predetermined region, thereby forming an edge portion along a part of the periphery of said light beam conversion portion, an end face made up of said edge portion and a part of said light beam conversion portion surrounded by said edge portion, and the first side wall which has the periphery of said end face as the one end thereof and is made up of a part of the side wall of said first groove portion, and is formed such that it comes into contact with the mounting groove of the supporting substrate;

providing the second groove portion by removing a predetermined region on other side of the optical substrate up to a predetermined depth from the surface of the predetermined region, thereby forming an end face made up of a part of the surface of said optical substrate, and the second side wall portion which has the periphery of said end face as the one end thereof and is made up of a part of the side wall of the second groove portion, and is formed such that it comes into contact with the mounting groove of the supporting substrate; and cutting said optical substrate along a predetermined cutting line, thereby obtaining an optical element which is provided with at least one of said light beam conversion portion and said first side wall corresponding thereto, at least one of said second side wall, a side face formed of a part of the bottom face of said first groove portion, a side face formed of a part of the bottom face of said second groove portion, and a side face formed of a part of the surface of said optical substrate.

2. A method for manufacturing an optical element as claimed in claim 1, wherein said light beam conversion portion, said first groove portion, and said second groove portion are formed by etching.

3. A method for manufacturing an optical element which is mounted on a supporting substrate having a groove for use in mounting the optical element thereon, comprising the steps of:

forming at least one of the first light beam conversion portion on one surface of an optical substrate;

providing the first groove portion by removing a predetermined region on one side of the periphery of said first light beam conversion portion up to a predetermined depth from the surface of said predetermined region, thereby forming an edge portion along a part of the periphery of said first light beam conversion portion, an end face made up of said edge portion and a part of said first light beam conversion portion surrounded by said edge portion, and the first side wall which has the periphery of said end face as the one end thereof and is made up of a part of the side wall of said first groove portion, and is formed such that it comes into contact with said mounting groove of the supporting substrate;

forming at least one of the second light beam conversion portions on the other surface of said optical substrate;

providing the second groove portion by removing a predetermined region on one side of the periphery of said second light beam conversion portion up to a predetermined depth from the other surface of said predetermined region, thereby forming an edge portion along a part of the periphery of said second light beam conversion portion, an end face made up of said edge portion and a part of said second light beam conversion portion surrounded by said edge portion, and the second side wall which has the periphery of said end face as the one end thereof and is made up of a part of the side wall of said second groove portion, and is formed such that it comes into contact with said mounting groove of the supporting substrate; and cutting said optical substrate along a predetermined cutting line, thereby obtaining an optical element which is provided with at least one of said first light beam conversion portion and said first side wall corresponding to thereto, at least one of said second light beam conversion portion and said second side wall corresponding to thereto, a side face formed of a part of the bottom face of said first groove portion, a side face formed of a part of the bottom face of said second groove portion, and a side face formed of a part of the surface of said optical substrate.

4. A method for manufacturing an optical element as claimed in claim 3, wherein said first light beam conversion portion, said second light beam conversion portion, said first groove portion, and said second groove portion are formed by etching.

5. A method for manufacturing an optical element which is mounted on a supporting substrate having a groove for use in mounting the optical element thereon, comprising the steps of:

forming a plurality of the first light beam conversion portions on one surface of an optical substrate such that they are arranged in a row at a predetermined interval;

providing the first groove portion by removing a predetermined region including the one side of the periphery of said first light beam conversion portion and existing along the direction of aligning said first light beam conversion portions, up to a predetermined depth from the surface of said predetermined region, thereby forming the first edge portion along a part of the periphery of said first light beam conversion portion, the first end face made up of said first edge portion and a part of said first light beam conversion portion surrounded by said first edge portion, the first side wall which has the periphery of said first end face as its one end and is formed of a part of the side wall of said first groove portion to have such a shape that it comes into contact with said mounting groove of the supporting substrate, the second end face formed of a part of the one surface of said optical substrate, and the second side wall which has the periphery of said second end face as its one end and is made up of a part of the side wall of said second groove portion to have such a shape that it comes into contact with said mounting groove of the supporting substrate;

forming a plurality of the second light beam conversion portions on the other surface of said optical substrate such that they are arranged in a row at a certain interval;

providing the second groove portion by removing a predetermined region including the one side of the periphery of said second light beam conversion portion and existing along the direction of aligning said second light beam conversion portions, up to a predetermined depth from the other surface of said predetermined region, thereby forming the second edge portion along a part of the periphery of said second light beam conversion portion, the third end face made up of said second edge portion and a part of said second light beam conversion portion surrounded by said second edge portion, the third side wall which has the periphery of said third end face as its one end and is made up of a part of the side wall of said second groove portion to have such a shape that it comes into contact with said mounting groove of the supporting substrate, the fourth end face formed of a part of the other surface of said optical substrate, and the fourth side wall which has the periphery of said fourth end face as its one end and is made up of a part of the side wall of said second groove portion to have such a shape that it comes into contact with said mounting groove of the supporting substrate, and cutting said optical substrate along a predetermined cutting line, thereby obtaining an optical element which is provided with at least one of said first light beam conversion portion and said first side wall corresponding to thereto, at least one of said second side wall, at least one of said second light beam conversion portion and said third side wall corresponding to thereto, at least one of said fourth side wall, a side face formed of a part of the bottom face of said first groove portion, a side face formed of a part of the bottom face of said second groove portion, and a side face formed of a part of the surface of said optical substrate.

6. A method for manufacturing an optical element as claimed in claim 5, wherein said first light beam conversion portion, said second light beam conversion portion, said first groove portion, and said second groove portion are formed by etching.

7. A method for manufacturing an optical element which is mounted on a supporting substrate having a groove for use in mounting the optical element thereon, comprising the steps of:

forming a plurality of the first light beam conversion portions on one surface of an optical substrate such that they are arranged in a row at a predetermined interval;

providing the first groove portion by removing a predetermined region including the one side of the periphery of said first light beam conversion portion and existing along the direction of aligning said first light beam conversion portions, up to a predetermined depth from the surface of said predetermined region, thereby forming the first edge portion along a part of the periphery of said first light beam conversion portion, the first end face made up of said first edge portion and a part of said first light beam conversion portion surrounded by said first edge portion, and the first side wall which has the periphery of said first end face as its one end and is formed of a part of the side wall of said first groove portion to have such a shape that it comes into contact with said mounting groove of the supporting substrate;

forming a plurality of the second light beam conversion portions on the other surface of said optical substrate such that they are arranged in a row at a certain interval;

providing the second groove portion by removing a predetermined region including the one side of the periphery of said second light beam conversion portion and existing along the direction of aligning said second light beam conversion portions, up to a predetermined depth from the other surface of said predetermined region, thereby forming the second edge portion along a part of the periphery of said second light beam conversion portion, the second end face made up of said second edge portion and a part of said second light beam conversion portion surrounded by said second edge portion, the second side wall which has the periphery of said second end face as its one end and is made up of a part of the side wall of said second groove portion to have such a shape that it comes into contact with said mounting groove of the supporting substrate, the third end face formed of a part of the other surface of said optical substrate, and the third side wall which has the periphery of said third end face as its one end and is made up of a part of the side wall of said second groove portion to have such a shape that it comes into contact with said mounting groove of the supporting substrate, and cutting said optical substrate along a predetermined cutting line, thereby obtaining an optical element which is provided with at least one of said first light beam conversion portion and said first side wall corresponding to thereto, at least one of said second light beam conversion portion and said second side wall corresponding to thereto, at least one of said third side wall, a side face formed of a part of the bottom face of said first groove portion, a side face formed of a part of the bottom face of said second groove portion, and a side face formed of a part of the surface of said optical substrate.

8. A method for manufacturing an optical element as claimed in claim 7, wherein said first light beam conversion portion, said second light beam conversion portion, said first groove portion, and said second groove portion are formed by etching.

9. An optical element comprising:

a handling portion having the first side face and the second side face opposing to said first side face;

a thin thickness portion extending from said handling portion, having the first stepped face with a step as formed to inwardly direct to said first side face and the second stepped face with a step as formed to inwardly directing to said second side face, each of said first and second stepped faces being constituted as side faces thereof;

the first projection portion having the first end face projecting in a boundary face between said first side face and said first stepped face and extending from said first side face, and the first side wall of which one end is located on said first end face while the other is located on said first stepped face;

the second projection portion having the second end face projecting in a boundary face between said second side face and said second stepped face and extending from said second side face, and the second side wall of which one end is located on said second end face while the other is located on said second stepped face, and a light beam conversion portion is formed in a predetermined part of a region spreading over said first end face and said first side face portion in the vicinity thereof.

10. An optical element as claimed in claim 9, wherein a light beam conversion portion is also formed in a predetermined part of a region spreading over said second end face and said second side face portion in the vicinity thereof.

11. An optical element as claimed in claim 10, wherein the light rays incident on one of said light beam conversion portions formed in a predetermined part of a region spreading over said first end face and said first side face portion in the vicinity thereof are emitted from the other one of said light beam conversion portions formed in a predetermined part of a region spreading over said second end face and said second side face portion in the vicinity thereof, said light beam conversion portion located on the light receiving side being arranged to rightly oppose to said light beam conversion portion located on the light emitting side.

12. An optical element as claimed in claim 10, wherein the light rays incident on one of said light beam conversion portions formed in a predetermined part of a region spreading over said first end face and said first side face portion in the vicinity thereof are emitted from the other one of said light beam conversion portions formed in a predetermined part of a region spreading over said second end face and said second side face portion in the vicinity thereof, said light beam conversion portion located on the light receiving side being arranged not to rightly oppose to said light beam conversion portion located on the light emitting side.

13. An optical element as claimed in claim 9, wherein said first and second side walls have an approximately same form, but a distance from said first side wall to the optical axis of said light beam conversion portion as formed in the predetermined region spreading over said first end face and said first side face portion in the vicinity thereof is made different from a distance from said second side wall to said optical axis.

14. An optical element as claimed in claim 9, wherein said optical element is made of a silicon crystalline substrate.

15. An optical element as claimed in claim 9, wherein said light beam conversion portion is constituted by a diffractive optical element.

16. An optical element as claimed in claim 9, wherein said light beam conversion portion is constituted by a lens.

17. An optical element as claimed in claim 9, wherein there are provided a plurality of said first projection portions and a plurality of said second projection portions, and the light beam conversion portion is formed in a predetermined part of a region spreading over at least one of a plurality of said first end faces corresponding to each of said first projection portions and said first side face portion in the vicinity thereof.

18. An optical element as claimed in claim 17, wherein said light beam conversion portion is formed in a predetermined part of a region spreading over at least one of a plurality of said second end faces corresponding to each of said second projection portions and said second side face portion in the vicinity thereof.

19. An optical element as claimed in claim 18, wherein the light rays incident on one of said light beam conversion portions formed in a predetermined part of a region spreading over said first end face and said first side face portion in the vicinity thereof are emitted from at least one of said light beam conversion portions formed in a predetermined part of a region spreading over said second end face and said second side face portion in the vicinity thereof, said light beam conversion portion located on the light receiving side being arranged to rightly oppose to said light beam conversion portion located on the light emitting side.

20. An optical element as claimed in claim 18, wherein the light rays incident on one of said light beam conversion portions formed in a predetermined part of a region spreading over said first end face and said first side face portion in the vicinity thereof are emitted from at least one of said light beam conversion portions formed in a predetermined part of a region spreading over said second end face and said second side face portion in the vicinity thereof, said light beam conversion portion located on the light receiving side being arranged not to rightly oppose to said light beam conversion portion located on the light emitting side.

21. An optical element as claimed in claim 17, wherein said optical element is made of a silicon crystalline substrate.

22. An optical element as claimed in claim 17, wherein said light beam conversion portion is constituted by a diffractive optical element.

23. An optical element as claimed in claim 17, wherein said light beam conversion portion is constituted by a lens.

* * * * *